United States Patent
Clarke et al.

(10) Patent No.: US 9,747,876 B1
(45) Date of Patent: Aug. 29, 2017

(54) ADAPTIVE LAYOUT OF SHEET MUSIC IN COORDINATION WITH DETECTED AUDIO

(71) Applicant: Amazon Technologies, Inc., Seattle, WA (US)

(72) Inventors: Frederick Hughes Clarke, Bellevue, WA (US); Andrew Scott Craft, Seattle, WA (US); Wendy Kathryn Paskoff, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/811,208

(22) Filed: Jul. 28, 2015

(51) Int. Cl.
- *G09B 15/00* (2006.01)
- *G10G 1/00* (2006.01)
- *G09B 15/02* (2006.01)

(52) U.S. Cl.
CPC ............ *G10G 1/00* (2013.01); *G09B 15/023* (2013.01)

(58) Field of Classification Search
CPC ................. G10G 1/00; G09B 15/023
USPC ........................................ 84/483.1
See application file for complete search history.

(56) References Cited

U.S. PATENT DOCUMENTS

2003/0100965 A1*  5/2003  Sitrick ............... G09B 15/023
                                            700/83

* cited by examiner

*Primary Examiner* — Jianchun Qin
(74) *Attorney, Agent, or Firm* — Pierce Atwood LLP

(57) ABSTRACT

A device is configured to display electronic sheet music. The device may display electronic sheet music that can be magnified and displayed in sequence by reflowing electronic musical symbols between pages. In addition, the device may adaptively determine a layout based on user preferences, such as a desired magnification, an orientation of a device or the like, and may display a current location in the electronic sheet music based on user input, a remote trigger, a desired playback speed or by monitoring an audio input from a microphone and determining a current location in the electronic sheet music. For example, the device may detect a series of pitches and display the electronic sheet music based on a most recent pitch in the series of pitches.

18 Claims, 22 Drawing Sheets

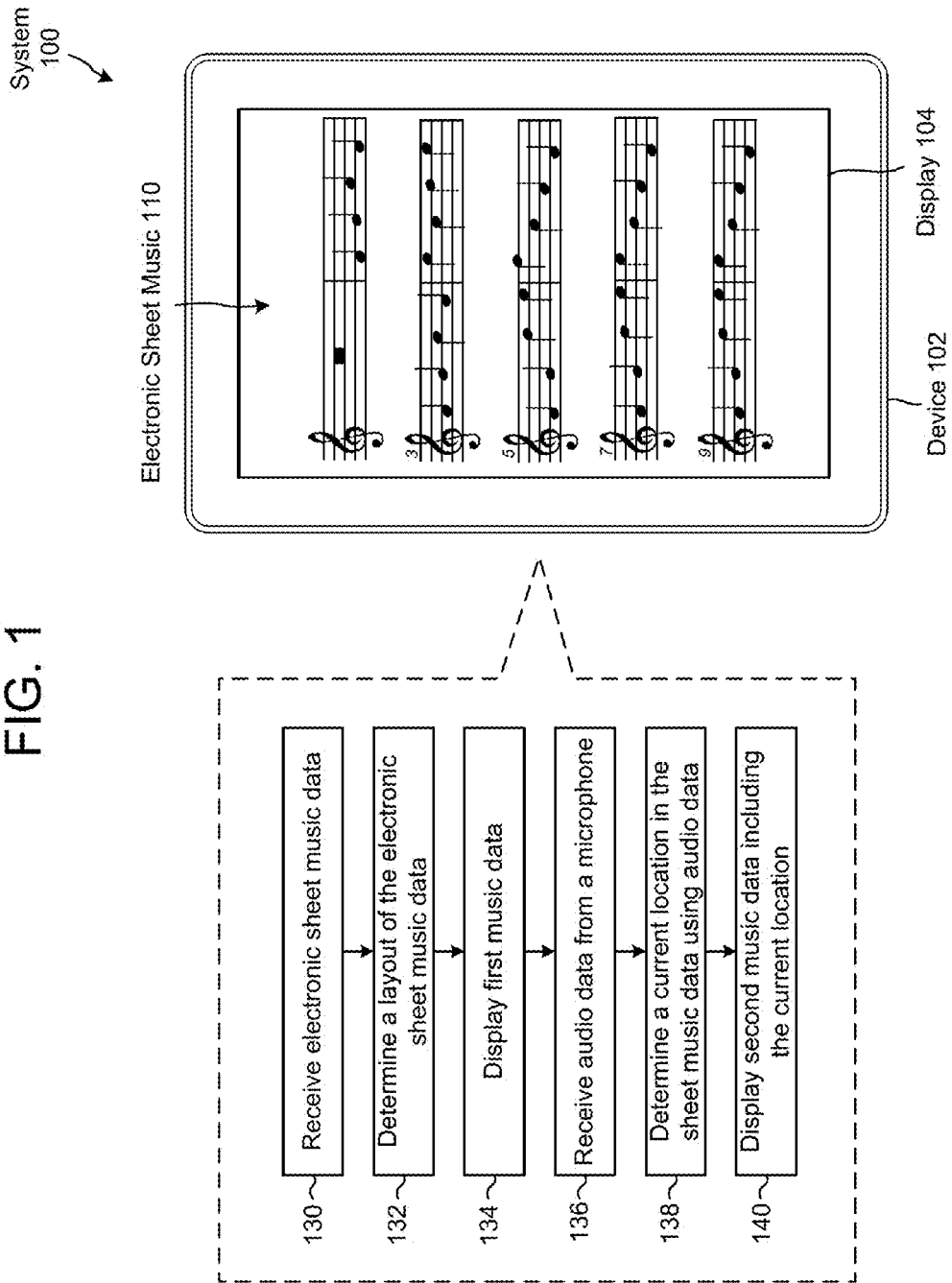

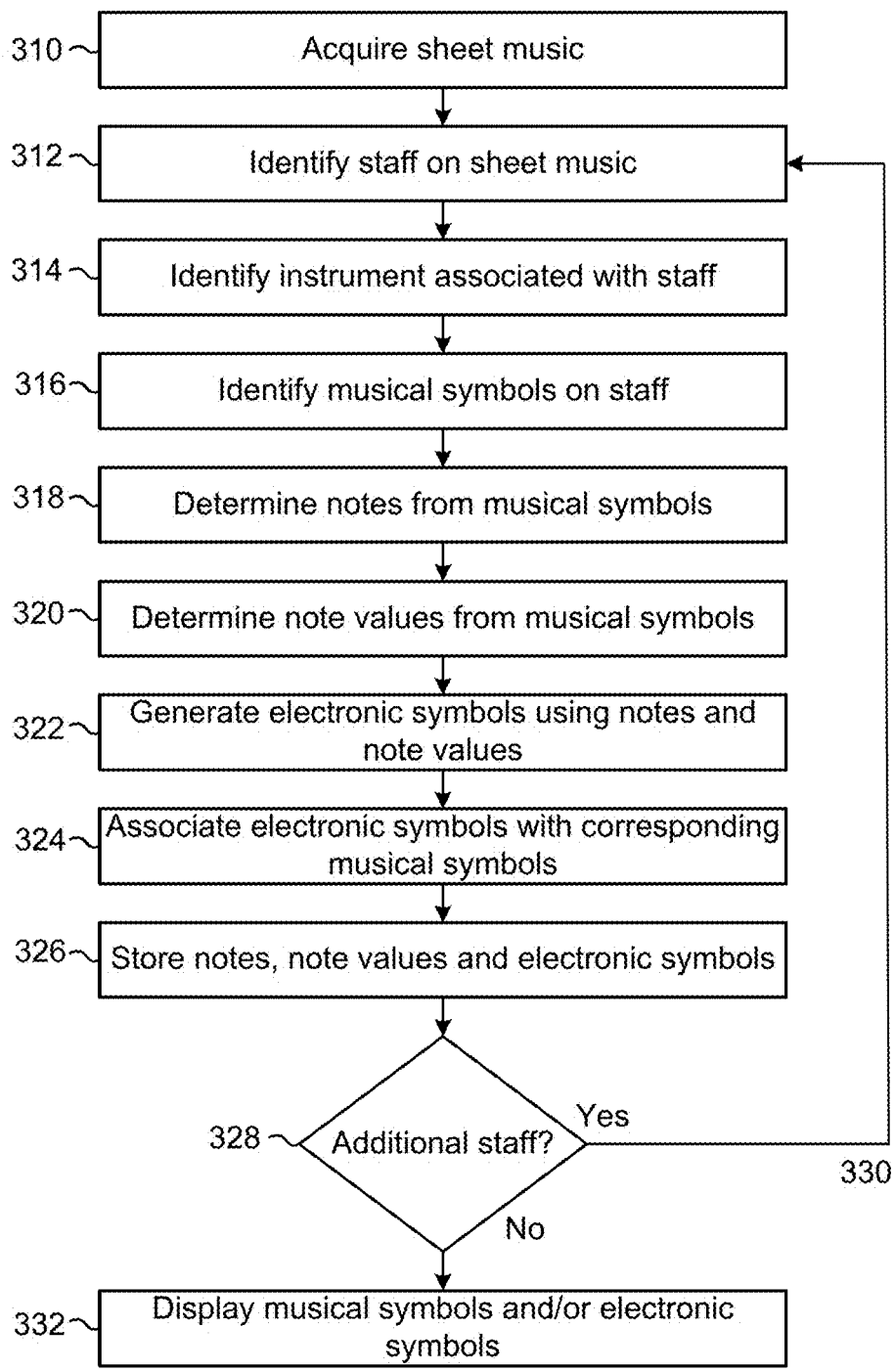

FIG. 4
Sheet Music 410
Musical Symbol 415
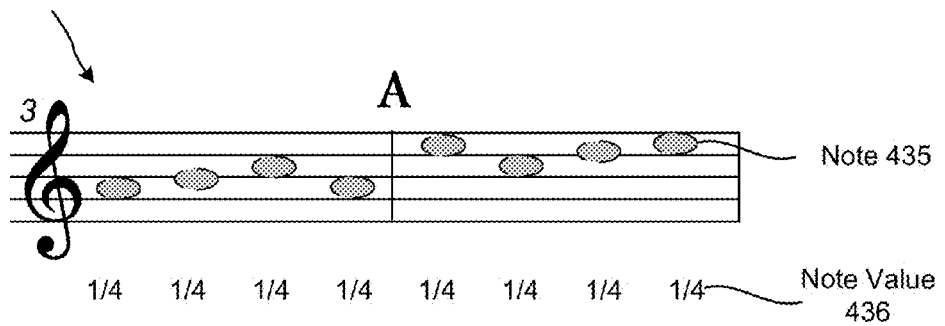
Electronic Music 430
Note 435
Note Value 436

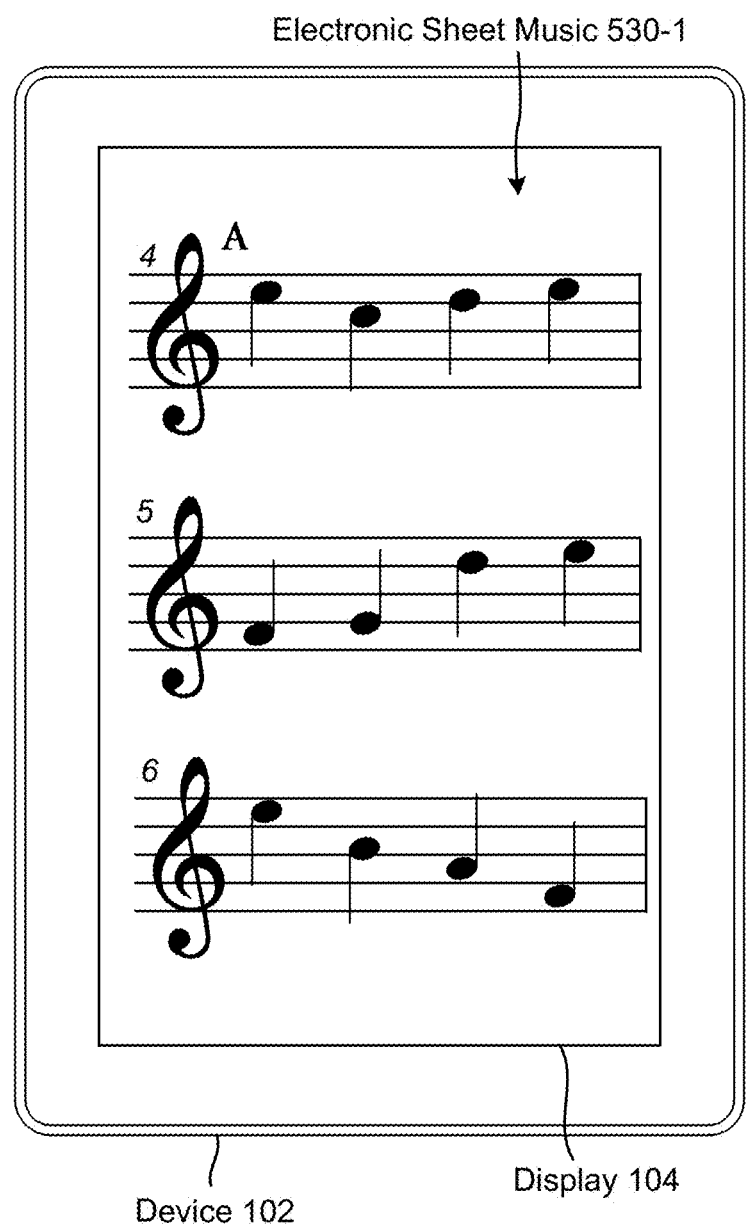

FIG. 7
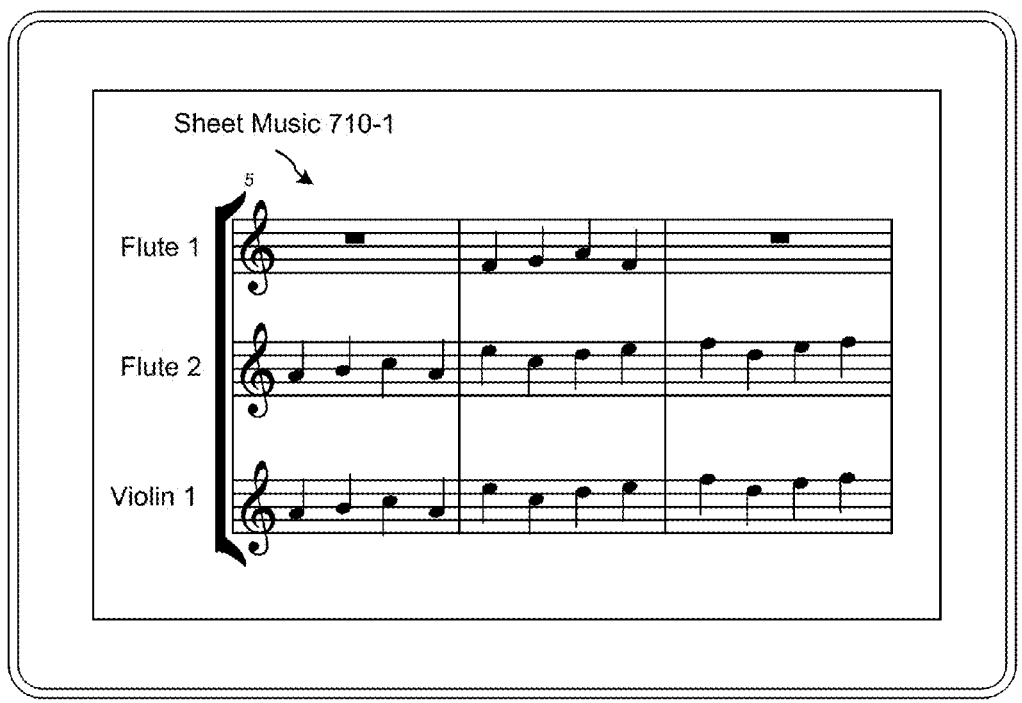
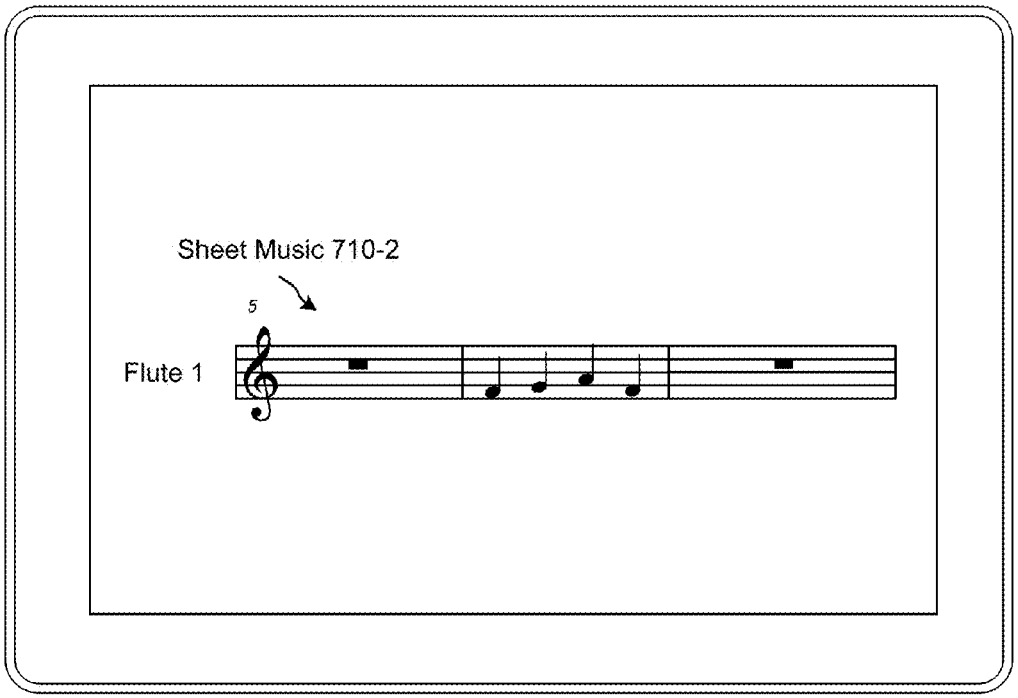

FIG. 10
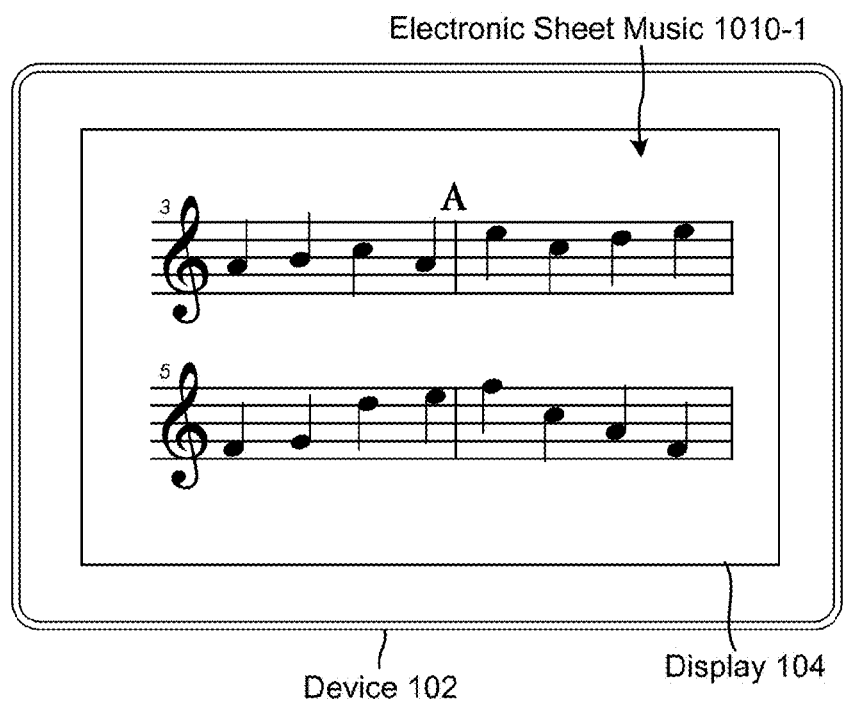
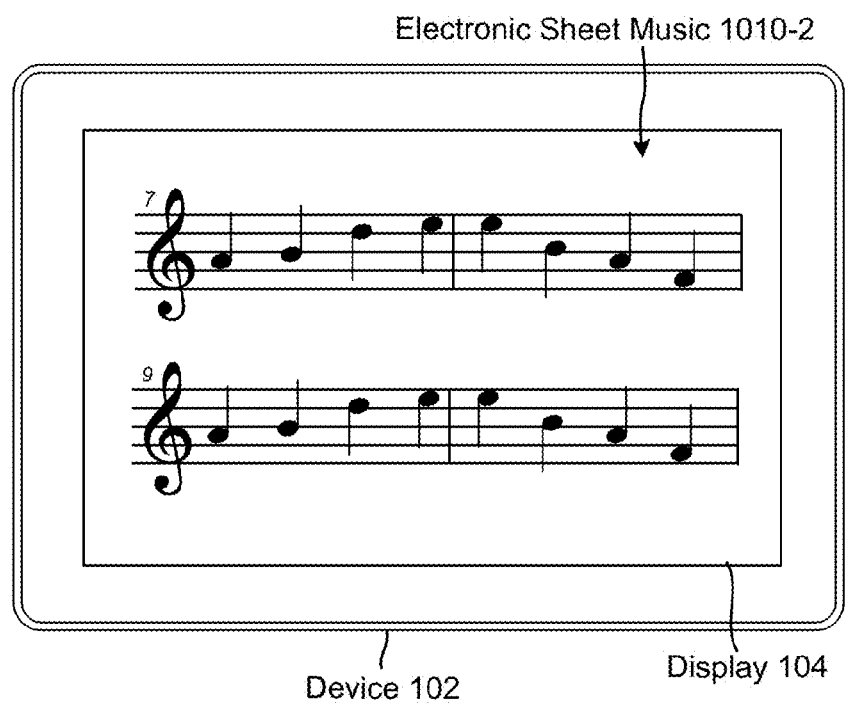

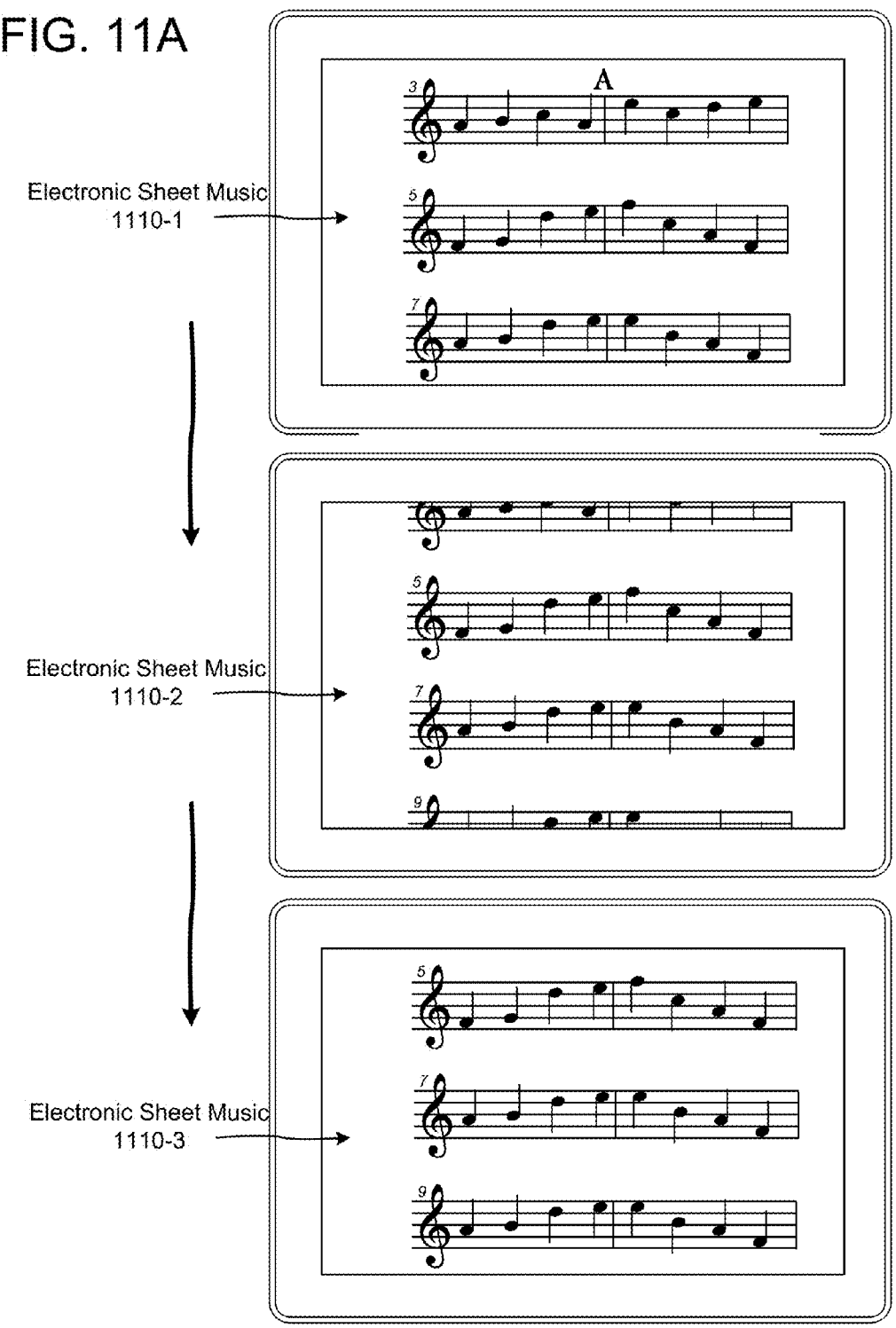

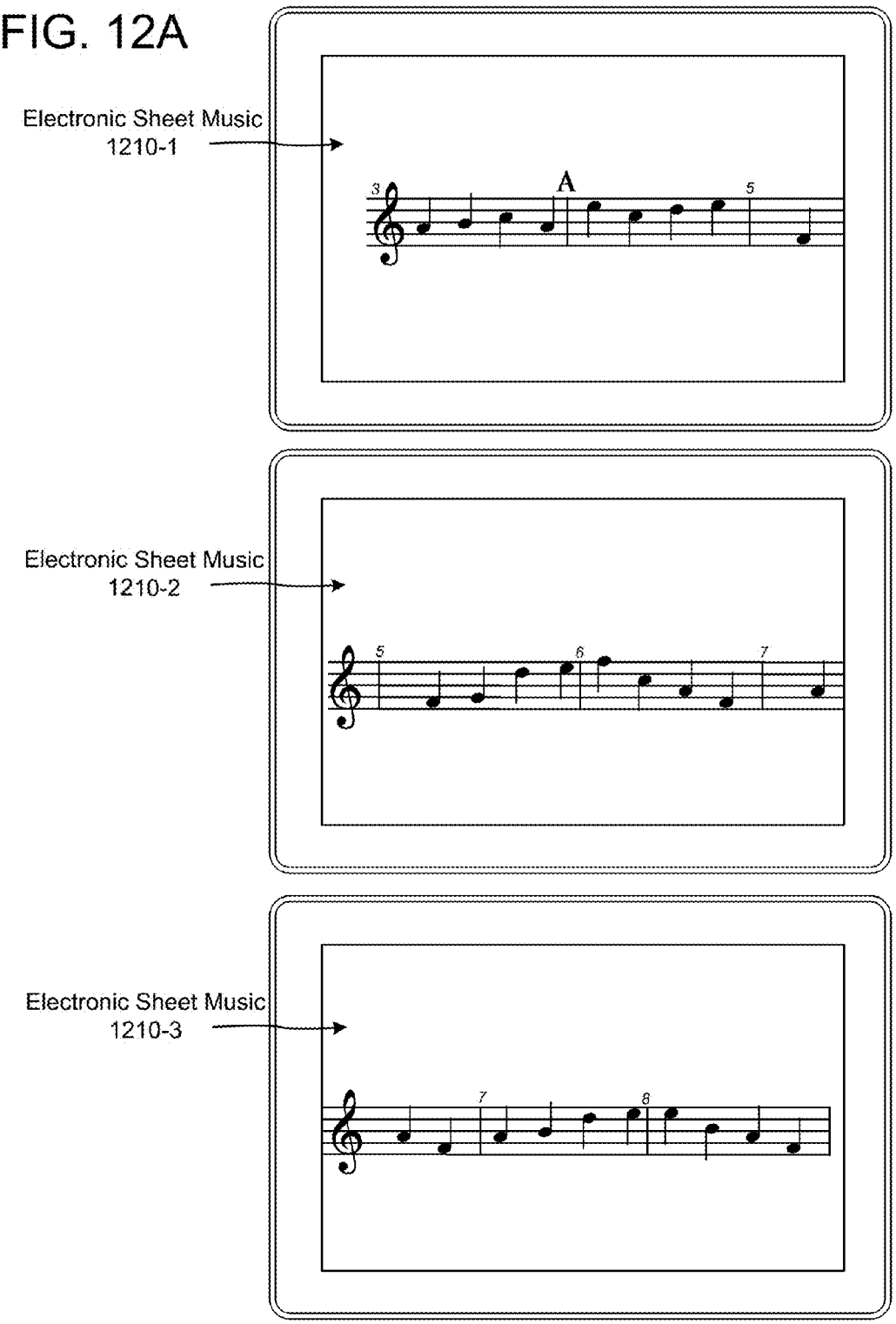

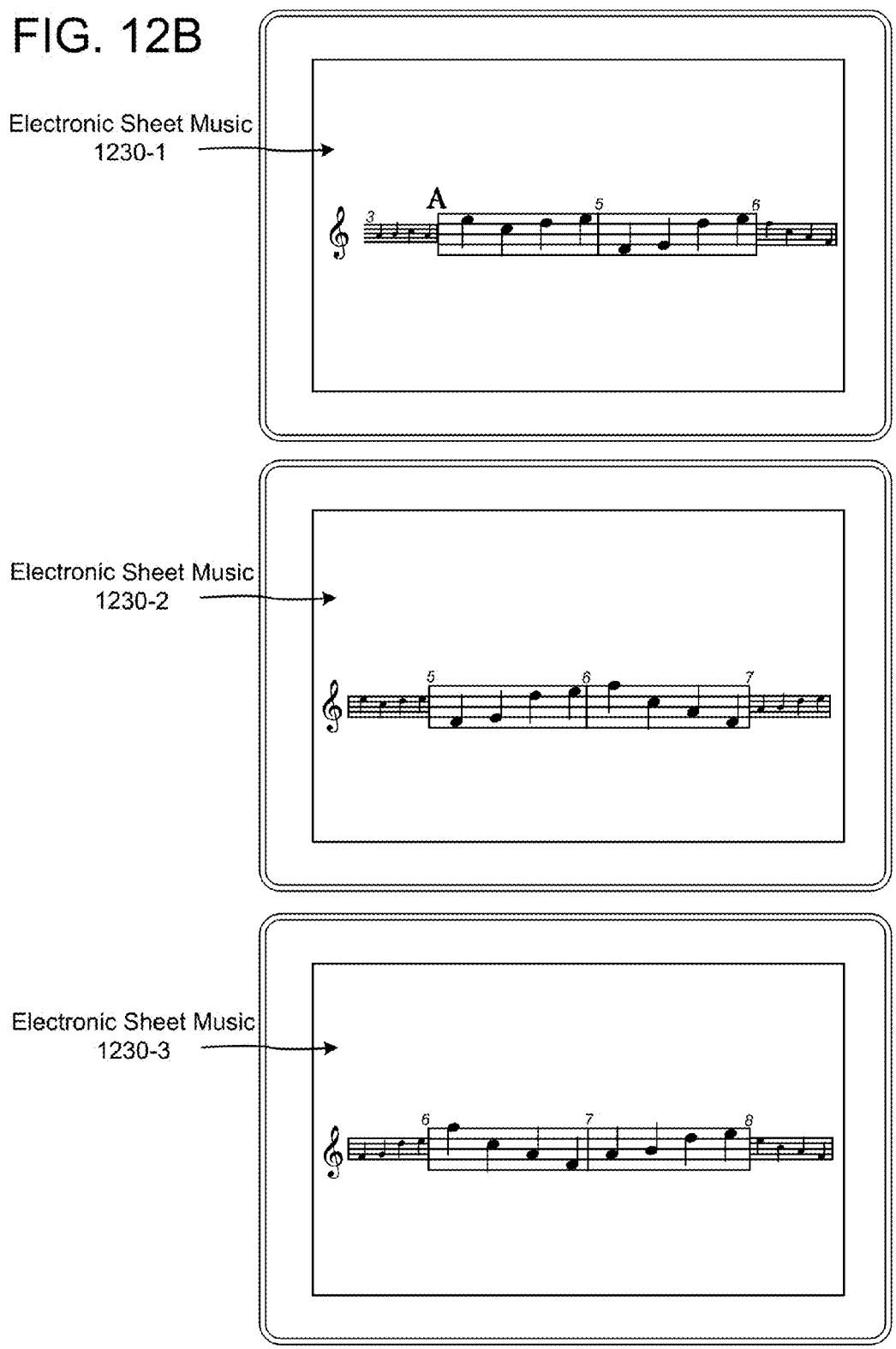

FIG. 13
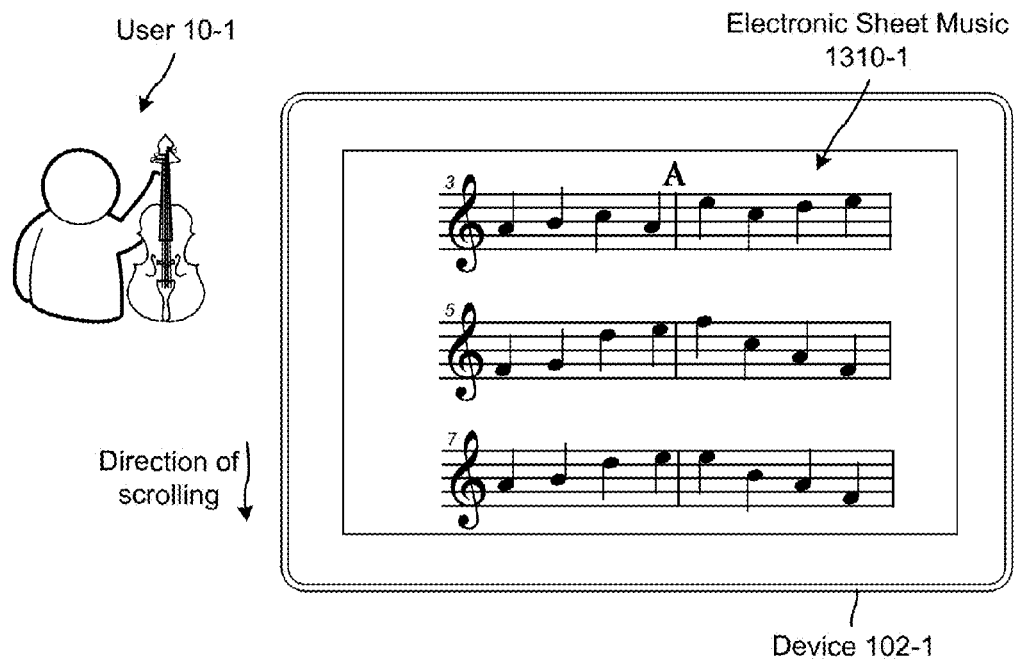
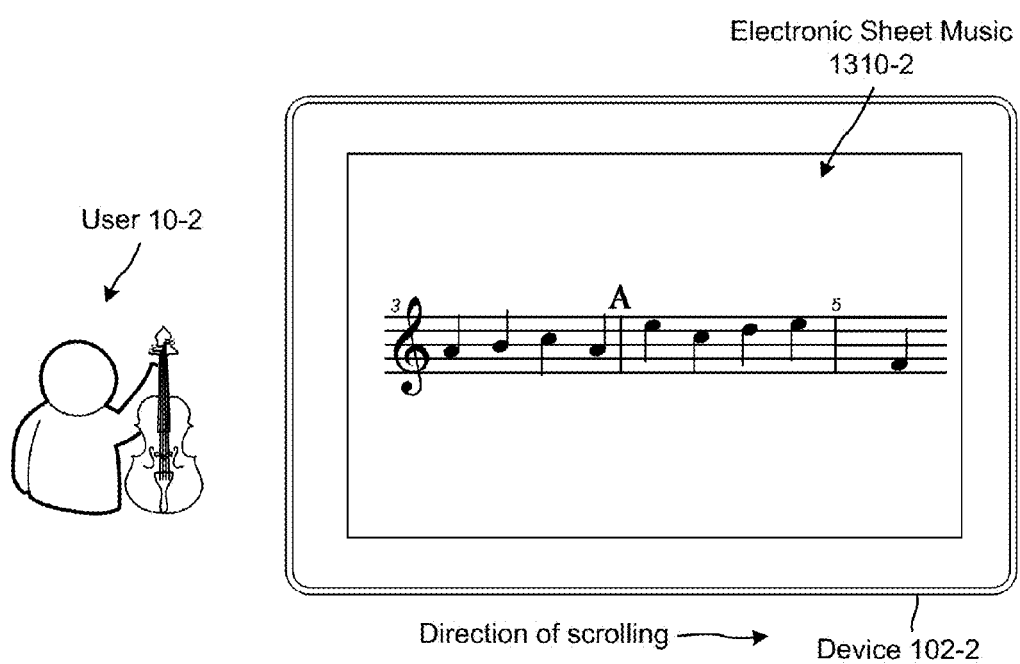

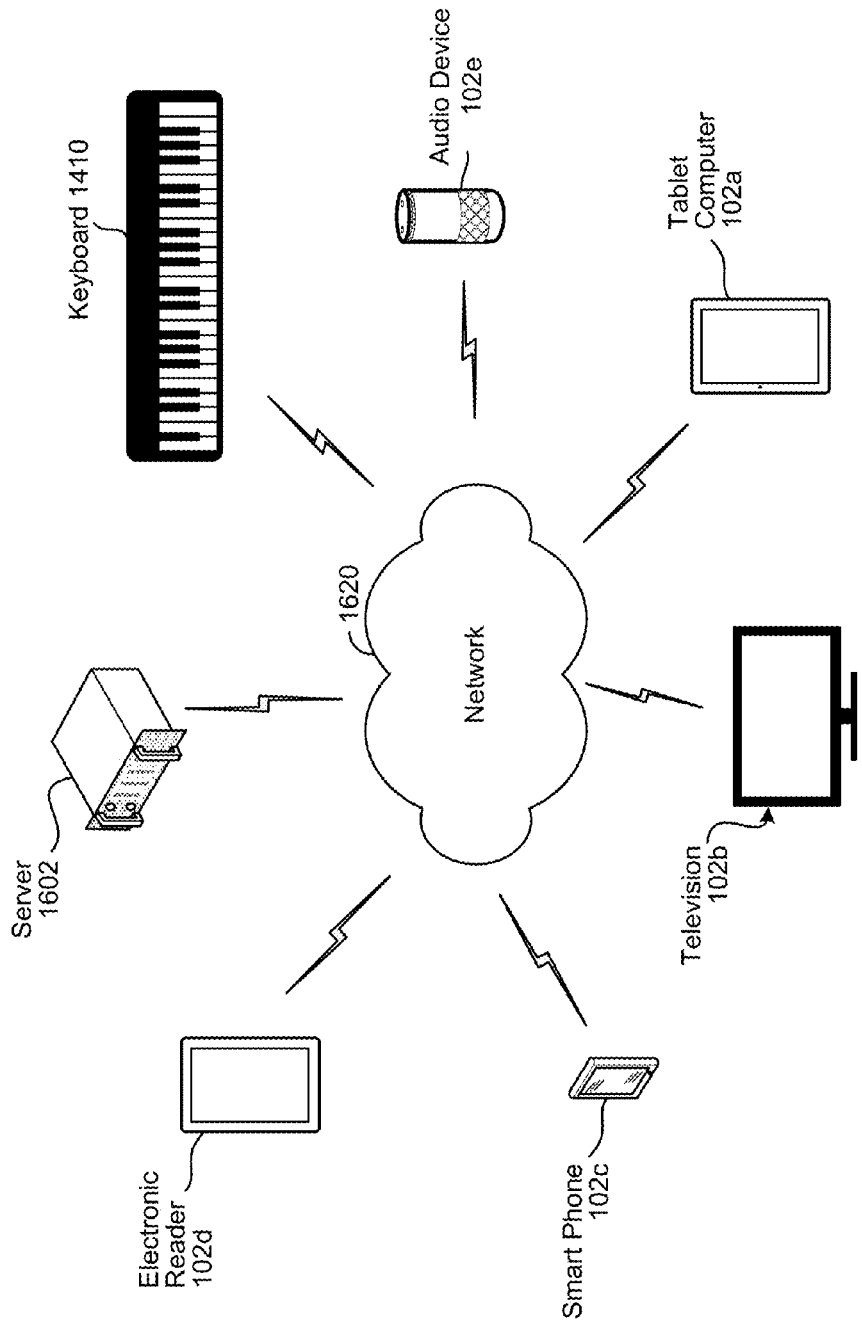

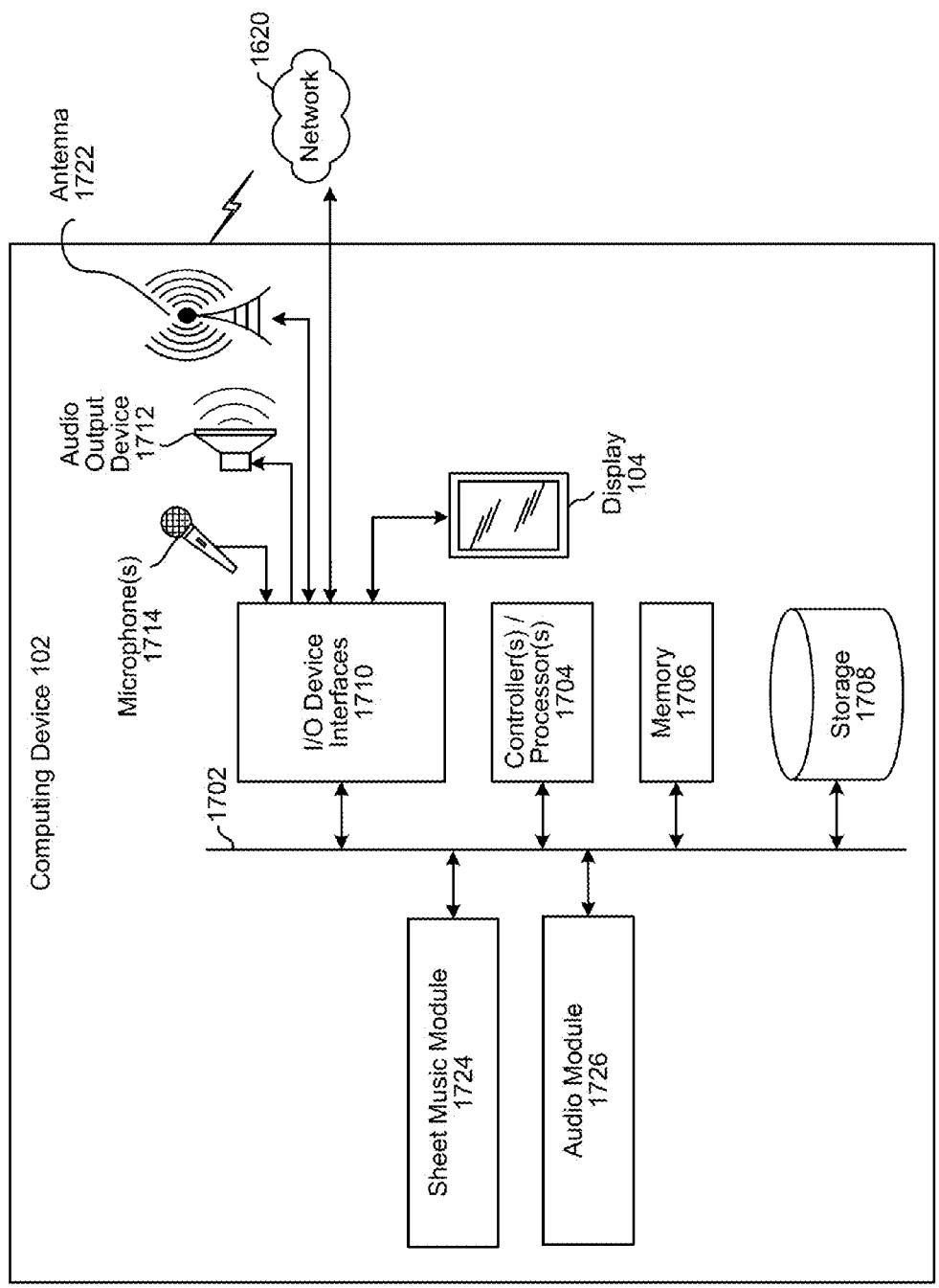

ADAPTIVE LAYOUT OF SHEET MUSIC IN COORDINATION WITH DETECTED AUDIO

BACKGROUND

With the advancement of technology, the use and popularity of electronic devices, such as mobile devices, has increased considerably. Mobile devices, such as smart phones and tablet computers, may be used to display electronic books, newspapers, magazines, blogs and other digital media or electronic publications, including sheet music.

BRIEF DESCRIPTION OF DRAWINGS

For a more complete understanding of the present disclosure, reference is now made to the following description taken in conjunction with the accompanying drawings.

FIG. 1 illustrates overviews of systems for implementing embodiments of the present disclosure.

FIG. 3 is a flowchart conceptually illustrating a method of converting musical symbols from an image of sheet music into electronic symbols according to embodiments of the present disclosure.

FIG. 4 illustrates an example of an image of sheet music and corresponding electronic sheet music according to embodiments of the present disclosure.

FIGS. 5A-5B illustrate examples of magnified electronic sheet music according to embodiments of the present disclosure.

FIG. 7 illustrates examples of displaying sheet music including multiple instruments or displaying sheet music including a single instrument according to embodiments of the present disclosure.

FIG. 10 illustrates an example of turning pages in electronic sheet music according to embodiments of the present disclosure.

FIGS. 11A-11C illustrate examples of scrolling vertically through electronic sheet music according to embodiments of the present disclosure.

FIG. 12A-12B illustrate examples of scrolling horizontally through electronic sheet music according to embodiments of the present disclosure.

FIG. 13 illustrates an example of a multi-device system displaying electronic sheet music according to embodiments of the present disclosure.

FIG. 16 is a block diagram conceptually illustrating an example of a computer network for use with the present system.

FIG. 17 is a block diagram conceptually illustrating example components of a computing device according to embodiments of the present disclosure.

DETAILED DESCRIPTION

Figure 2B:
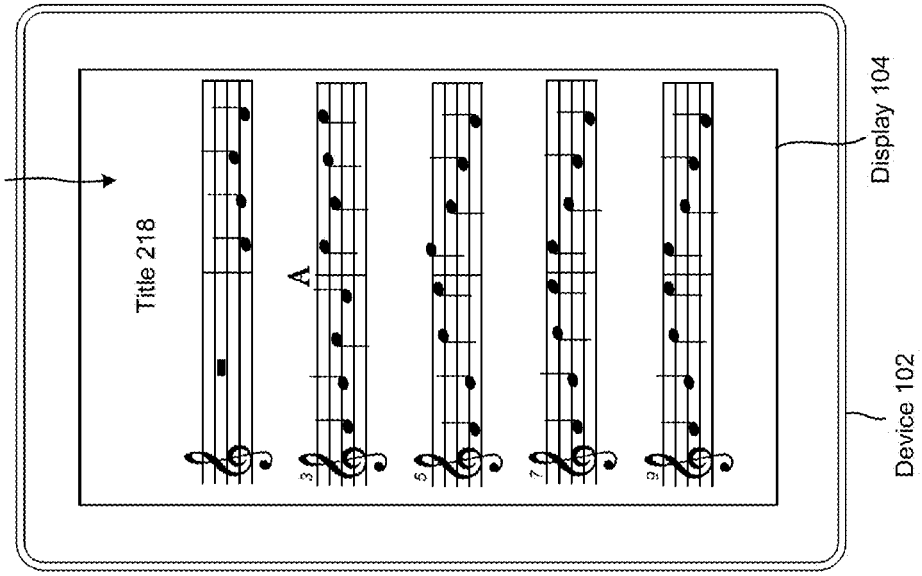
FIGS. 2A-2C illustrate sheet music and a user interface showing sheet music.

A computing device, such as a computer, tablet, smartphone, electronic reader, etc., may be used to display electronic books, newspapers, magazines, blogs and other digital media or electronic publications, including sheet music. However, sheet music is typically displayed using a fixed layout, such as a Portable Document Format (PDF) or an image of printed sheet music. As the sheet music has a fixed layout, a size of the sheet music is fixed based on the fixed layout. Thus, if the device magnifies a view of the sheet music, portions of the sheet music may be outside a display of the device.

In order to provide a more complete set of features, provided is a system for improved display of electronic sheet music that can be magnified and displayed in sequence by reflowing electronic musical symbols between pages. In addition, the system may adaptively determine a layout based on user preferences (e.g., a desired magnification, an orientation of a device or the like) and may display a current location in the electronic sheet music based on user input, a remote trigger, a desired playback speed or monitoring an audio input from a microphone and determining a current location in the electronic sheet music.

As described herein, "sheet music" may refer to sheet music data, which is an electronic representation of sheet music that the device may visually represent on the display using a fixed layout, whereas "electronic sheet music" may refer to electronic sheet music data, which is an electronic representation of electronic sheet music that the device may visually represent on the display using a variety of layouts based on a zoom magnification, device orientation or other settings. For example, the electronic sheet music data may include a series or sequence of electronic musical symbols and the device may visually represent the series of electronic musical symbols as first electronic sheet music using a first magnification and as second electronic sheet music using a second magnification, the series of electronic musical symbols reflowed in the second electronic sheet music so that the series of electronic musical symbols are displayed in order using additional pages relative to the first electronic sheet music. Similarly, "musical symbols" may refer to musical symbols included in the fixed layout sheet music, whereas electronic musical symbols may refer to musical symbols visually represented in the electronic sheet music that also include associated data, such as a pitch (note) and duration (note value) indicated by the electronic musical symbols. For example, musical symbols may be an image or visual representation of the musical symbols included in the sheet music and the device may display the musical symbols. In contrast, electronic musical symbols may include a visual representation of the electronic musical symbol to display, along with a pitch (note) and duration (note value) indicated by the electronic musical symbol. Therefore, the device may display the electronic musical symbol, generate audio based on the electronic musical symbol or search the electronic musical symbol based on a series of pitches. Alternatively or additionally to storing the pitch (note), the electronic musical symbol may include a frequency associated with the note (e.g., the frequency of middle C is 261.6 Hz). Thus, a device may determine a unique note from audio data and determine a frequency associated with the unique note.

Content (e.g., electronic documents, sheet music, electronic sheet music or the like) may be stored using a variety of file formats, and some of the file formats may use markup languages such as Extensible Markup Language (XML). For example, data including sheet music may be stored in fixed layout file formats, such as image files or Portable Document Format (PDF) files, while electronic sheet music data may be stored in music notation file formats, such as MusicXML™ files (MusicXML™ is a proprietary format owned by MakeMusic® Incorporated, although the present disclosure is not limited thereto), or the electronic musical symbols may be saved as a sequence of commands, for example using a Musical Instrument Digital Interface (MIDI) protocol to generate a Standard MIDI File (SMF). The device may interpret electronic sheet music data, such as a MusicXML file or a SMF, and visually represent the electronic musical symbols on a display of the device as the electronic sheet music. In some examples, the MusicXML and/or SMF may be associated with sheet music, such as a PDF, but may be stored separately from the sheet music.

A single file may include data associated with sheet music, electronic sheet music and/or audio accompaniment (e.g., audio data associated with a single song or multiple songs). For example, a first file may include data associated with sheet music, electronic sheet music and/or audio accompaniment associated with a first song, while a second file may include data associated with sheet music, electronic sheet music and/or audio accompaniment associated with a second song and a third song. In addition, a single file may include data associated with sheet music, electronic sheet music and/or audio accompaniment for a single instrument or multiple instruments. For example, the first file may only include data associated with sheet music and/or electronic sheet music for a violin, while the second file may include data associated with sheet music, electronic sheet music and/or audio accompaniment for both a violin and a cello. Therefore, one file may include data associated with multiple songs for multiple instruments (e.g., set list for an entire orchestra), multiple songs for a single instrument (e.g., set list for a violin in the orchestra), a single song for multiple instruments (e.g., single song for the entire orchestra) or a single song for a single instrument (e.g., single song for the violin).

FIG. 1 illustrates an overview of a system 100 for implementing embodiments of the present disclosure. The system 100 includes a computing device 102 having a display 104. The display 104 may be a display capable of receiving input via contact between an object (such as a finger, stylus, etc.) and the display 104. As part of the operation, the computing device 102 displays a user interface (UI), which may display sheet music. The sheet music may be static, such as image(s) of sheet music, or may be dynamic, such as electronic notes displayed as electronic sheet music that is operable by different functions, for example to play the electronic sheet music to convert the electronic sheet music to audible music. Static sheet music may be displayed at various zoom magnifications, but the image(s) of the sheet music is fixed and therefore the sheet music cannot be adjusted based on the zoom magnification. In contrast, dynamic sheet music may be displayed at various zoom magnifications and the electronic sheet music may be adjusted based on the zoom magnification, such that individual measures and notes may be shifted from page to page based on the zoom magnification. Thus, a location of the individual measures may change based on the zoom magnification.

The device 102 may receive (130) sheet music, such as by accessing electronic sheet music data or file(s)/document(s) including electronic sheet music. The electronic sheet music may be an electronic representation of sheet music but has an adaptive layout and may be reflowed based on a number of measures and/or staffs displayed on a display 104 of the device 102.

The device 102 may determine (132) a layout of the electronic sheet music data. For example, the device 102 may determine the layout for the display 104 using a resolution of the display 104, an orientation of the device 102, a first magnification, user preferences or the like. The layout may identify a first number of measures displayed in a horizontal direction and a second number of staffs displayed in a vertical direction. The device 102 may reflow the electronic sheet music data based on the layout. For example, the device 102 may organize musical symbols and/or measures included in the electronic sheet music data using the first number of measures and/or the second number of staffs. As a first example, the device 102 may determine the layout of the device 102 to display two measures and two staffs at a time and may reflow the electronic sheet music data by associating measures in groups of two. Thus, the device 102 may display a first staff (e.g., measures 1-2) and a second staff (e.g., measures 3-4) at a first time and shift the second staff vertically upwards to display the second staff and a third staff (e.g., measures 5-6) at a second time. During the reflow process, the device 102 organizes and/or associates the measures to allow for advancing through the electronic sheet music data staff by staff. As a second example, the device 102 may determine the layout of the device 102 to display four measures and one staff at a time and may reflow the electronic sheet music data by associating neighboring measures in sequence. Thus, the device 102 may display a first staff (e.g., measures 1-4) at a first time and may display a second staff (e.g., measures 5-8) at a second time. During the reflow process, the device 102 organizes and/or associates the measures to allow for advancing through the electronic sheet music data measure by measure.

The device 102 may display (134) first music data from the electronic sheet music data at a first location and a first time. The first music data may include a note and a note value for each musical symbol in a first series of musical symbols and the device 102 may display the first series of musical symbols sequentially using the first magnification. For example, the device 102 may display the first series of musical symbols using the first number of measures and the second number of staffs. As a first example, the device 102 may display the first series of musical symbols on a first staff (e.g., measures 1-2) and a second staff (e.g., measures 3-4) at the first time. As a second example, the device 102 may display the first series of musical symbols on a first staff (e.g., measures 1-4) at the first time.

The device 102 may receive (136) audio data from a microphone and may determine (138) a current location in the sheet music data. For example, the user may be performing music associated with the electronic sheet music individually and the device 102 may capture audio data, identify the music associated with the user in the audio data and determine the current location in the electronic sheet music. Thus, the device 102 may display the electronic sheet music at a pace specified by the user, such that the current location corresponds to a note currently and/or recently played by the user. As a second example of audio tracking, the device 102 may determine the current location within the electronic sheet music using audio associated with other musicians. For example, the user may be performing music associated with the electronic sheet music with other musicians and the device 102 may capture audio data, identify the music associated with one or more of the musicians in the audio data and determine a current location in the electronic sheet music. Thus, the device 102 may display the electronic sheet music at a pace specified by the group of musicians, regardless of a current location of the user.

As a third example of audio tracking, the device 102 may determine the current location within the electronic sheet music using audio data associated with an accompaniment for the electronic sheet music. For example, the device 102 (or an external device) may play audio and/or video corresponding to the accompaniment at a pace specified by the electronic sheet music and the device 102 may determine a current location in the electronic sheet music based on the accompaniment. Thus, the device 102 may display the electronic sheet music at a pace specified by the accompaniment, regardless of a current location of a user. However, the disclosure is not limited thereto and the device 102 may instead display the electronic sheet music at a pace specified by the user and modify playback of the audio and/or video corresponding to the accompaniment accordingly, as will be discussed in greater detail below with regard to FIG. 14.

However, the present disclosure is not limited thereto and the device 102 may determine the current location using a variety of techniques, such as using a remote trigger (e.g., the device 102 receives user input such as contact on the display 104 or input from an external device, such as a foot pedal, an audio device, an external device displaying the electronic sheet music or the like), using preset tempos included in the electronic sheet music (e.g., the device 102 determines the tempo of the electronic sheet music updates the current location automatically to match the tempo), or the like.

In some examples, the sheet music may repeat a series of notes in multiple locations. For example, a recurring theme, melody, harmony or the like may be played by one or more instruments multiple times. Therefore, the device 102 may require additional input to determine which instance of the series of notes corresponds to the current location in the sheet music. In a first example, a user of the device 102 may input a starting location in the sheet music (e.g., the user may specify a measure number, rehearsal letter, individual note or the like) prior to the device 102 determining the current location. Thus, the device 102 may identify the series of notes subsequent to the starting location as the current location in the sheet music and may continually update the current location based on previously played notes.

In a second example, the device 102 may select a particular series of notes from multiple series of notes based on user preferences and/or starting locations determined by the device 102. For example, the device 102 may substitute a beginning of the sheet music as the starting location and may identify the first series of notes subsequent to the beginning of the sheet music as the current location. Additionally or alternatively, the device 102 may determine a duration of time from a beginning of the audio data and may identify the series of notes using the duration of time. Thus, an end of the series of notes may correspond to a twenty second mark in the audio data and the device 102 may select the particular series of notes occurring twenty seconds after a transition (e.g., a beginning of the sheet music, a rehearsal letter, etc. that is associated with a transition in the sheet music).

In a third example, the device 102 may receive additional audio input and/or an additional series of notes from remote devices (e.g., additional devices 102 or the like) and may determine the current location in the sheet music based on the audio input to the device 102 and the additional audio input/additional series of notes. For example, a first device 102 may record audio associated with a first instrument and a second device 102 may record audio associated with a second instrument. The first device 102, the second device 102 and/or a remote device (e.g., a server) may determine a first series of notes associated with the first instrument and a second series of notes associated with the second instrument and therefore determine a current location including the first series of notes and the second series of notes.

In some examples, the device 102 may include a practice mode for practicing the sheet music. When in the practice mode, the device 102 may compare the series of notes to a previously played series of notes to determine if the musician is repeating a portion of the sheet music. For example, the musician may play a first series of notes and then make a mistake, replaying the first series of notes a second time. The device 102 may recognize the repetition and determine the current location even when the current location was previously played. For example, when the musician finishes the first series of notes, plays a second series of notes and then repeats the first series of notes, the device 102 may determine the current location as the beginning of the first series of notes. Thus, the device 102 may repeat portions of the sheet music instead of jumping ahead to a subsequent iteration of the series of notes.

After determining the current location, the device 102 may display (140) second music data from the electronic sheet music data at the current location and a second time. The second music data may include a note and a note value for each musical symbol in a second series of musical symbols and the device 102 may display the second series of musical symbols sequentially using the first magnification. The second series of musical symbols may overlap the first series of musical symbols (e.g., one or more musical symbols may be included in the first series and the second series and therefore displayed at the first time and the second time) or may follow the first series of musical symbols (e.g., a beginning of the second series of musical symbols follows an end of the first series of musical symbols). As a first example, the second series may follow the first series and the device 102 may display the second series of musical symbols on a third staff (e.g., measures 5-6) and a fourth staff (e.g., measures 7-8) at the second time. As a second example, the second series may overlap the first series and the device 102 may display the second series of musical symbols on the second staff (e.g., measures 3-4) and a third staff (e.g., measures 5-6) at the second time. As a third example, the second series may follow the first series and the device 102 may display the second series of musical symbols on the first staff (e.g., measures 5-8) at the second time. As a fourth example, the second series may overlap the first series and the device 102 may display the second series of musical symbols on the first staff (e.g., measures 3-6) at the second time. However, while the above examples are provided as an illustration, the present disclosure is not limited thereto. Instead, the device 102 may display the first music data and/or the second music data using any examples illustrated in the following drawings or a combination thereof without departing from the present disclosure.

Figure 2A:
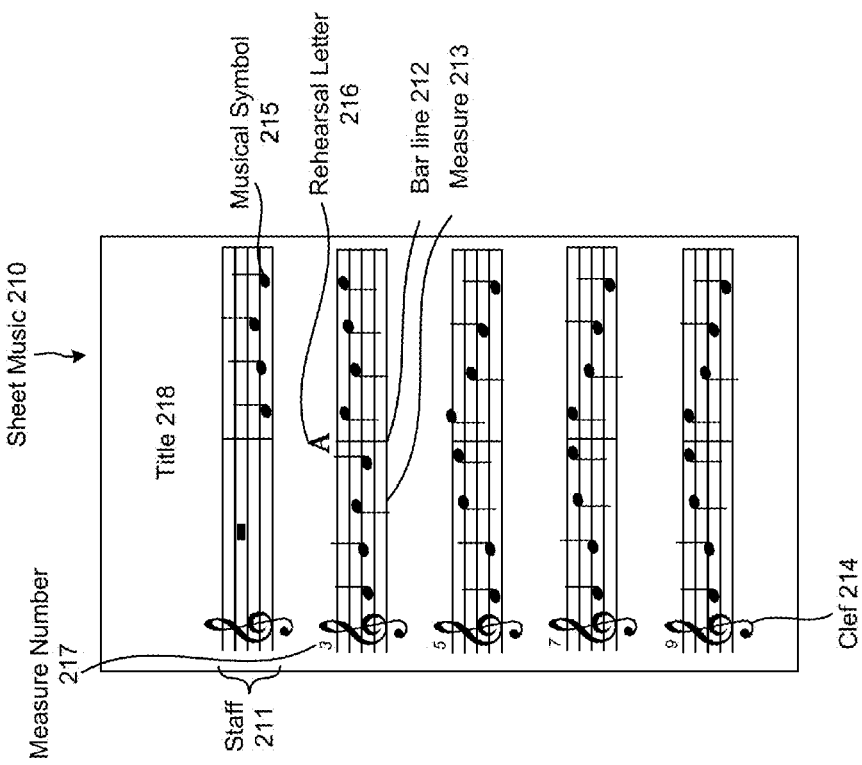
Figure 2C:
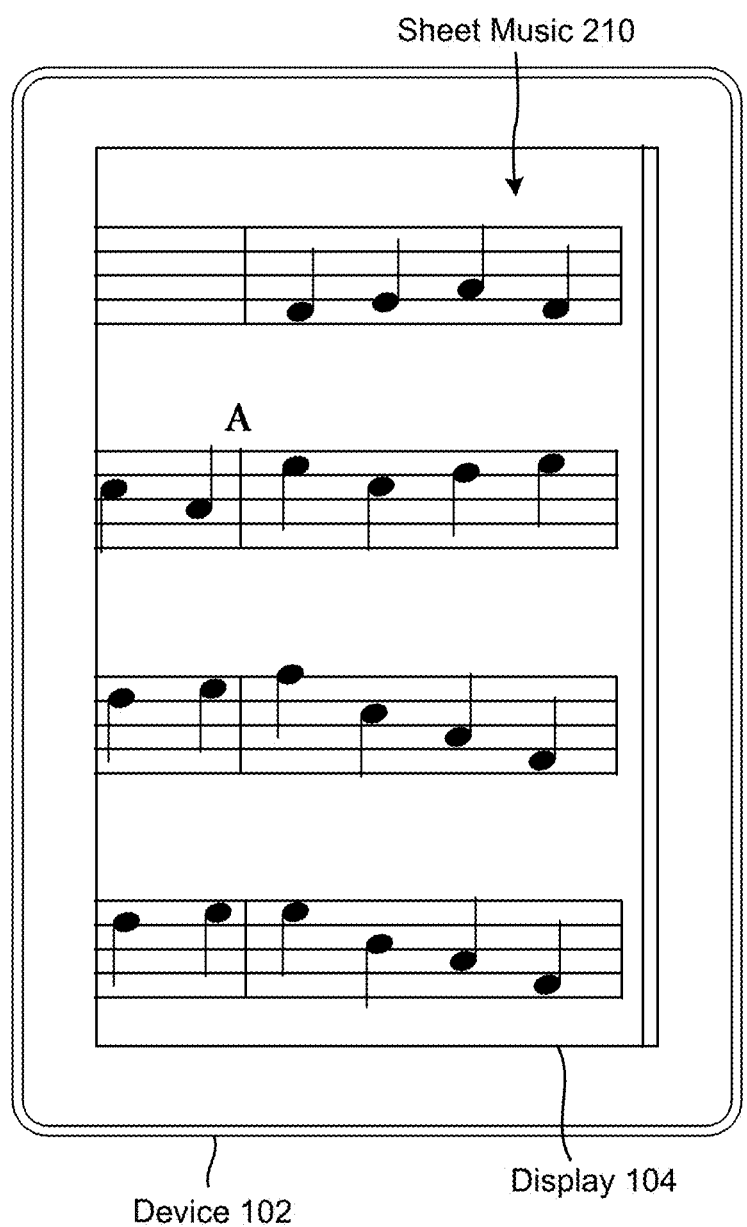

FIGS. 2A-2C illustrate sheet music 210 and a user interface showing the sheet music 210. As illustrated in FIG. 2A, the sheet music 210 may include staves, such as staff 211. As illustrated the sheet music 210 is comprised of 5 evenly spaced staff lines, and the staves may be divided into measures, such as measure 213, by bar lines such as bar line 212. The staves may include clefs, such as clef 214, indicating a pitch range of the staves. The staves may include musical symbols, such as musical symbol 215, indicating a pitch (note) and duration (note value) of the music.

As an example of a marker, rehearsal letter 216 may be used to identify a particular section of the sheet music 210. To identify locations within the sheet music, measure numbers, such as measure number 217, may indicate a number for a particular measure. Thus, the rehearsal letter 216 may have a location of 4, indicating it begins at the fourth measure number in the sheet music 210 of Title 218.

FIG. 2B illustrates a user interface displaying an image of the sheet music 210. As the device 102 is displaying an image, when the sheet music 210 is enlarged, as illustrated in FIG. 2C, individual elements of the sheet music 210 may be enlarged but the sheet music 210 may not be reformatted to fit the display 104. Thus, a user may encounter difficulty playing music with an enlarged view of the sheet music, as portions of the sheet music are not visible on the display 104.

FIG. 3 is a flowchart conceptually illustrating a method of converting musical symbols from sheet music into electronic symbols according to embodiments of the present disclosure. By converting the sheet music into electronic symbols, the device 102 may display electronic sheet music using an adaptive layout to display the electronic sheet music in various orientations, resolutions, magnifications or the like. In addition, converting the sheet music into electronic symbols may provide additional functionality beyond displaying the sheet music, such as allowing the device 102 to automatically turn pages, scroll or otherwise change a display within the electronic sheet music. To generate the electronic symbols, the device 102 may acquire (310) sheet music, such as by accessing file(s), document(s) and/or image(s) including sheet music.

The device 102 may identify (312) a staff on the sheet music, the staff being a typical musical notation encompassing five evenly spaced staff lines. The device 102 may identify (314) an instrument associated with the staff and identify (316) musical symbols positioned on the staff. For example, the sheet music may include a system having multiple instruments and may have notations identifying the multiple instruments. The device 102 may determine (318) notes (pitch) from the musical symbols. For example, the staff may include a clef indicating a pitch range and each musical symbol may be associated with a particular pitch in the pitch range. The device 102 may determine (320) note values (duration) from the musical symbols. The note values may be a duration of the musical symbol based on a timing system identified in the sheet music. The device 102 may generate (322) electronic symbols using the notes and the note values and may associate (324) the electronic symbols with corresponding musical symbols.

The device 102 may store (326) the notes, the note values and the electronic symbols. For example, the device 102 may store the notes, the note values and the electronic symbols separate from the sheet music, such as in an index, a metadata file or another file associated with the sheet music.

The device 102 may determine (328) if an additional staff is present in the sheet music. If an additional staff is present, the device 102 may loop (330) to step 312 and repeat steps 312-326 for the additional staff.

If the additional staff is not present, the device 102 may display (332) musical symbols and/or electronic symbols. In a first example, the device 102 may display the sheet music without the associated electronic symbols, using the notes and note values obtained to provide additional functionality to the sheet music. In a second example, the device 102 may display the sheet music with the associated electronic symbols, such as overlaid above the sheet music. In this example, the user may see the electronic symbols and may modify the electronic symbols to correct mistakes or to modify the underlying sheet music. In a third example, the device 102 may display electronic sheet music using the electronic symbols. In this example, the device 102 does not display the sheet music and may provide the electronic symbols in various formats and/or magnification not available using the sheet music.

FIG. 4 illustrates an example of an image of sheet music and corresponding electronic music according to embodiments of the present disclosure. As illustrated in FIG. 4, sheet music 410 may include musical symbols such as musical symbol 415. The device 102 may generate electronic music 430 including notes, such as note 435, and note values, such as note value 436, based on the musical symbols included in the sheet music 410. The device 102 may determine the notes and note values based on information included in the sheet music 410, such as a location of the notes on the staff, a clef associated with the staff and a type of musical symbol displayed. While FIG. 4 illustrates the notes in the electronic music 430 as hashed ovals, this is for ease of illustration and electronic symbols generated from the notes and note values may be visually represented similarly to the musical symbols displayed in the sheet music 410. Thus, the device 102 may display the electronic sheet music 430 similarly to the sheet music 410 while reflowing content of the electronic sheet music 430 for different layouts.

The device 102 may display the electronic sheet music 410 using multiple different layouts. The device 102 may determine characteristics of a displayed layout based on a resolution, display size, magnification, device orientation, number of instruments, user preferences or the like. Examples of characteristics may include a number of measures per staff (e.g., a number of measures displayed in a horizontal dimension of the display 104), a number of instruments to display (e.g., a number of instruments visible on the display 104), a number of instruments per staff (e.g., a number of instruments included in each staff), a number of staffs per page (e.g., a number of staffs displayed in a vertical dimension of the display 104) or the like.

As a first example, the device 102 may be a smartphone with a relatively small display 104, such as a display size of three inches by five inches. When the smartphone displays electronic sheet music for a single instrument using a portrait orientation (e.g., five inches high, three inches wide), the smartphone may display one measure per staff and four staffs at a time. As the smartphone advances through the electronic sheet music, the smartphone may update the electronic sheet music on the display 104 using different methods, as described in greater detail below, while still displaying one measure per staff and four staffs at a time. For example, if the smartphone displays the electronic sheet music as sequential pages, the smartphone may display a first page (e.g., measures 1-4), followed by a second page (e.g., measures 5-8), followed by a third page (e.g., measures 9-12) and so on. When the smartphone displays the electronic sheet music for a single instrument using a landscape orientation (e.g., three inches high, five inches wide), the smartphone may display two measures per staff and two staffs at a time. As described above, the smartphone may update the electronic sheet music while displaying two measures per staff and two staffs at a time, displaying the first page (e.g., measures 1-4), followed by a second page (e.g., measures 5-8), followed by a third page (e.g., measures 9-12) and so on.

However, if a user of the smartphone magnifies the electronic sheet music while in the landscape orientation, the smartphone may display two measures per staff and one staff at a time, with the staff relatively larger in the display 104 than in the example described above. Thus, the smartphone may display a first page (e.g., measures 1-2), followed by a second page (e.g., measures 3-4), followed by a third page (e.g., measures 5-6) and so on. Based on user preferences, the smartphone may display the electronic sheet music using different magnifications in the portrait orientation and the landscape orientation. For example, the smartphone may display the electronic sheet music using a lower magnification (e.g., zoomed out) while in the portrait orientation and a higher magnification (e.g., zoomed in) while in the landscape orientation.

As a second example, the device 102 may be an electronic reader (e-reader) with a relatively larger display 104, such as a display size of five inches by eight inches. When the e-reader displays electronic sheet music for a single instrument using a portrait orientation (e.g., eight inches high, five inches wide), the e-reader may display two measure per staff and four staffs at a time. As the smartphone advances through the electronic sheet music, the e-reader may update the electronic sheet music on the display 104 using different methods, as described in greater detail below, while still displaying two measures per staff and four staffs at a time. For example, if the e-reader displays the electronic sheet music as sequential pages, the e-reader may display a first page (e.g., measures 1-9), followed by a second page (e.g., measures 9-16), followed by a third page (e.g., measures 17-24) and so on. When the e-reader displays the electronic sheet music for a single instrument using a landscape orientation (e.g., five inches high, eight inches wide), the e-reader may display four measures per staff and three staffs at a time. Thus, the e-reader may update the electronic sheet music while displaying four measures per staff and three staffs at a time, displaying the first page (e.g., measures 1-12), followed by a second page (e.g., measures 13-24), followed by a third page (e.g., measures 25-36) and so on.

However, if a user of the e-reader magnifies the electronic sheet music while in the landscape orientation, the e-reader may instead display two measures per staff and two staffs at a time, with the staff relatively larger in the display 104 than in the example described above. Thus, the e-reader may display a first page (e.g., measures 1-4), followed by a second page (e.g., measures 5-8, followed by a third page (e.g., measures 9-12) and so on. Based on user preferences, the e-reader may display the electronic sheet music using different magnifications in the portrait orientation and the landscape orientation. For example, the e-reader may use a lower magnification (e.g., zoomed out) while in the portrait orientation and a higher magnification (e.g., zoomed in) while in the landscape orientation.

In addition, the layout used to display the electronic sheet music may be based on the device. For example, a user may use a first layout for a smartphone and a second layout for an e-reader. Therefore, the smartphone may display the electronic sheet music using the first layout (e.g., displaying measures 1-4) while the e-reader may display the electronic sheet music using the second layout (e.g., displaying measures 1-12). Thus, a frequency of page turns or other updating of the electronic sheet music may be relatively higher for the smartphone compared to the e-reader.

Figure 5B:
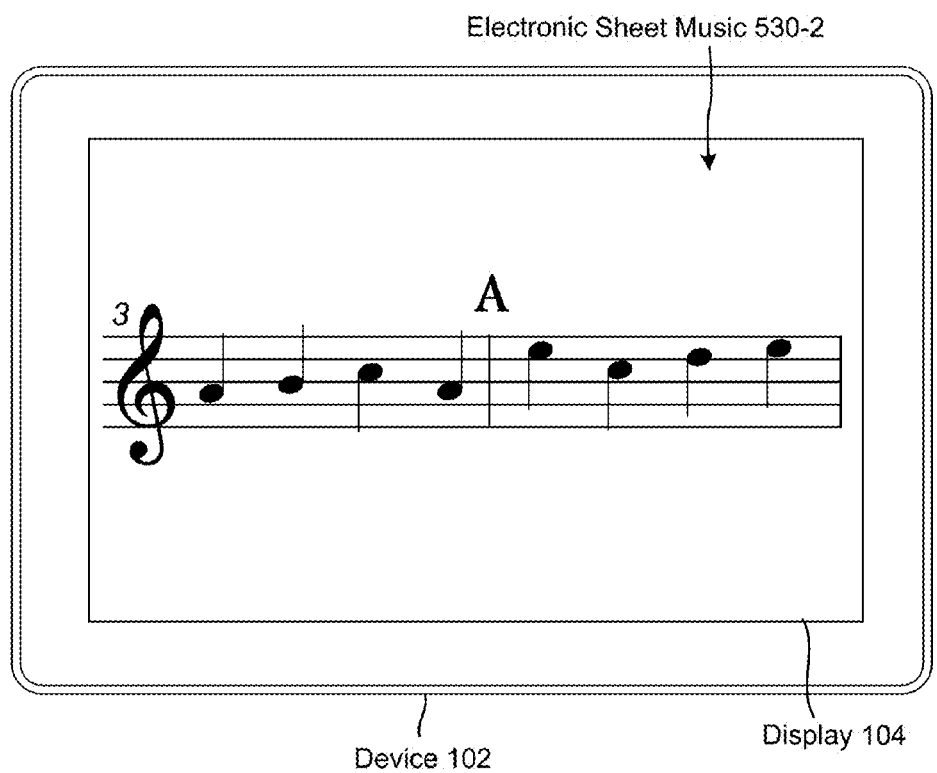

FIGS. 5A-5B illustrate examples of magnified electronic sheet music according to embodiments of the present disclosure. As discussed above, the device 102 may display electronic sheet music using the electronic symbols associated with the sheet music. As a result, the device 102 may provide the electronic sheet music in various formats and/or magnifications not available while displaying images of the sheet music. For example, the device 102 may reformat the electronic sheet music, moving individual electronic symbols or measures between staffs based on an orientation, resolution, magnification or the like associated with the electronic sheet music. As illustrated in FIG. 5A, for example, the device 102 may magnify the electronic sheet music 530-1 so that a measure stretches across a horizontal length of the display 104 while in a portrait orientation, such that the device 102 displays one measure per staff and three staffs per page. The device 102 may reflow the electronic sheet music 530-1, for example by rearranging measures and electronic symbols, so that a user may see the electronic sheet music in sequence at a greater magnification. FIG. 5B illustrates a second example of magnifying the electronic sheet music, but in a landscape orientation. As illustrated in FIG. 5B, the device 102 may magnify the electronic sheet music 530-2 so that two measures stretch across a horizontal length of the display 104, such that the device 102 displays two measures per staff and one staff per page, although the present disclosure is not limited thereto. As discussed above, the device 102 may reflow the electronic sheet music 530-2, for example by rearranging measures and electronic symbols, so that a user may see the electronic sheet music in sequence at a greater magnification. While FIGS. 5A-5B illustrate the electronic sheet music 530 including notes associated with a single instrument on a staff, the disclosure is not limited thereto and the electronic sheet music 530 may display notes for multiple instruments on a single staff.

Figure 6:
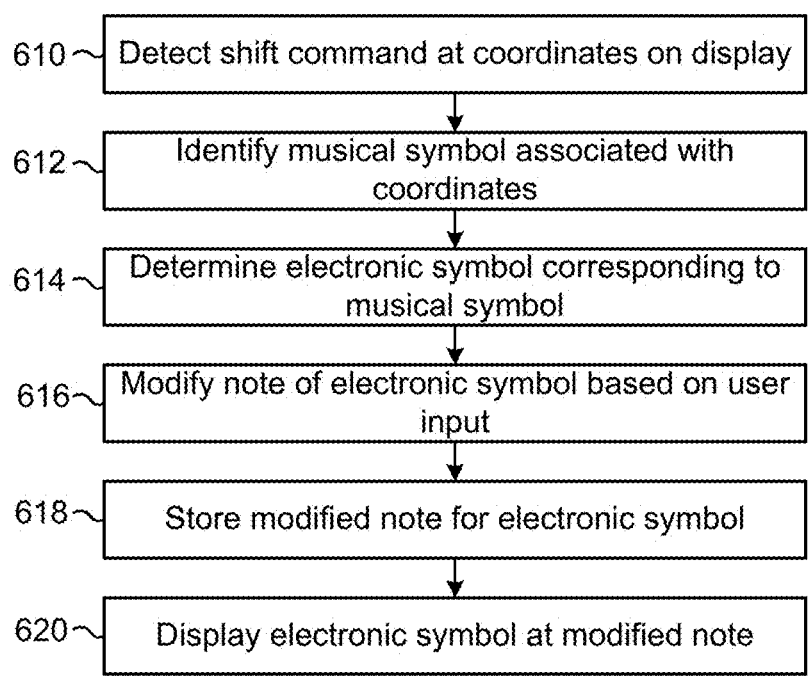
FIG. 6 is a flowchart conceptually illustrating a method of modifying electronic notes according to embodiments of the present disclosure.

One of the benefits of displaying electronic sheet music is that a user of the device 102 may instruct the device 102 to modify the electronic symbols included in the electronic sheet music. For example, the user may prefer certain notes to be higher or lower than the published musical symbol (e.g., musical symbols as originally composed) and may instruct the device 102 to modify the corresponding electronic symbols. FIG. 6 is a flowchart conceptually illustrating a method of modifying electronic notes according to embodiments of the present disclosure. As the device 102 has electronic symbols associated with the sheet music, the device 102 may modify the electronic symbols and allow a user to update the music.

The device 102 may (610) detect a shift command at coordinates on a display, identify (612) a musical symbol associated with the coordinates and determine (614) an electronic symbol corresponding to the musical symbol. In a first example, the device 102 may be displaying an image of sheet music and the device 102 may identify the musical symbol on the sheet music and determine the electronic symbol corresponding to the musical symbol. In a second example, the device 102 may be displaying an image of sheet music with electronic symbols superimposed on the sheet music. In this example, the device 102 may identify the electronic symbol directly based on the coordinates. In a third example, the device 102 may be displaying electronic sheet music and the device 102 may identify the electronic symbol based on the coordinates.

The device 102 may modify (616) a note (pitch) of the electronic symbol based on user input. For example, the user may click and drag the electronic symbol to a new staff line on the staff corresponding to a separate note. Alternatively, the user may select an electronic symbol, insert a shift command and click on the new staff line to assign the selected electronic symbol to the separate note. The disclosure is not limited thereto and may include any methods known to one of skill in the art for changing a note of the electronic symbol.

The device 102 may store (618) the modified note for the electronic symbol. For example, the device 102 may store the modified note with the electronic symbols, which may be stored separate from the sheet music, such as in an index, a metadata file or another file associated with the sheet music.

The device 102 may display (620) an electronic symbol at the modified note. In a first example, the device 102 may display an image of sheet music with the electronic symbol at the modified note, so that a user may see the modified note and the original note. In a second example, the device 102 may display electronic sheet music with the electronic symbol at the modified note along with an indicator of the original note. In a third example, the device 102 may display electronic sheet music with the electronic symbol at the modified note without any indicator of the original note, although the electronic symbol may include a visual representation alerting the user that the electronic symbol is a modified note, such as by using a different color or other methods known to one of skill in the art.

FIG. 7 illustrates examples of displaying sheet music for multiple instruments simultaneously and displaying electronic sheet music for a single instrument according to embodiments of the present disclosure. For example, the device 102 may display first sheet music 710-1 that includes a system having notes associated with Flute 1, Flute 2 and Violin 1. The first sheet music 710-1 may be beneficial for a conductor, a musician that needs to be aware of other musicians, a listener following along to multiple instruments or the like. For example, the conductor may prefer to view electronic sheet music for all instruments, a range of instruments and/or a mix of instruments depending on location within the sheet music. The device 102 may store user preferences associated with the electronic sheet music and may display different instruments at different locations, such as displaying electronic sheet music corresponding to a harmony, melody, theme or the like for each measure.

As another example, a musician may need to be aware of other musicians to have a better sense of when to play. Thus, the musician may prefer to view electronic sheet music for their own instrument as well as for another instrument to provide context within the overall composition. For example, the device 102 may display electronic sheet music including notes associated with Flute 1 and Flute 2 to provide context (e.g., audio cues) for the flutists. In contrast, the device 102 may display second sheet music 710-2 for a single musician playing a single instrument. Thus, each musician in an orchestra, band or the like may have a unique display showing the corresponding electronic sheet music for their instrument.

In a further example, the device 102 may display sheet music for a single instrument some of the time and display sheet music for multiple instruments simultaneously in certain situations. For example, the sheet music for a first instrument may include periods of inactivity (e.g., multiple measures of rest). During the period of inactivity, the device 102 may display notes associated with the first instrument along with notes associated with a second instrument to provide audio cues for a musician playing the first instrument. Additionally or alternatively, the device 102 may display a shadow view during the period of inactivity, displaying only the notes associated with the second instrument using a different style (e.g., notes/staff/etc. in a different color, symbol(s) illustrating the notes are associated with the second instrument or the like) to provide the audio cues for the musician playing the first instrument. Additionally or alternatively, in some examples the device 102 may display a countdown view during the periods of inactivity, determining a duration of time until the next note (e.g., correlating the number of rests/measures until a subsequent note to a duration of time based on a tempo of the sheet music) and displaying the duration of time. The duration of time may be displayed in place of the sheet music (e.g., a countdown timer displayed across the device 102) or in addition to the sheet music (e.g., the countdown timer displayed in a corner of the device 102). For certain instruments, such as percussion instruments that are played identically each time (e.g., hammer, cannon, cymbals, etc.), the device 102 may display the countdown timer instead of displaying normal sheet music, with the countdown timer determined based on audio captured from surrounding instruments or a current location received from a remote device.

Figure 8:
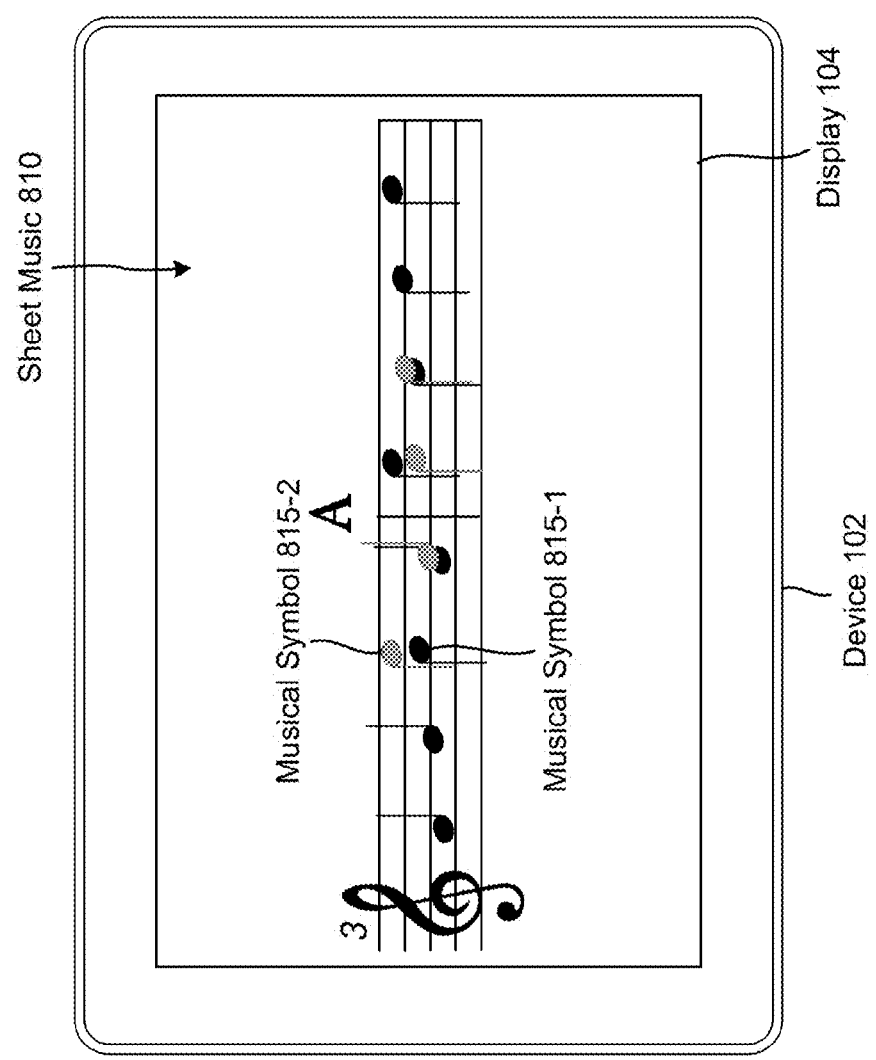
FIG. 8 illustrates an example of displaying electronic symbols for multiple instruments on a single staff according to embodiments of the present disclosure.

FIG. 8 illustrates an example of displaying electronic symbols for multiple instruments on a single staff according to embodiments of the present disclosure. As illustrated in FIG. 8, sheet music 810 may display first musical symbols, such as first musical symbol 815-1, along with second musical symbols, such as second musical symbol 815-2. Thus, a user may see the first musical symbols and the second musical symbols on a single staff, allowing the user to see multiple instruments at once. The number of instruments on a staff may be determined based on user preferences and may vary throughout the electronic sheet music.

As the user performs music using the electronic sheet music, the device 102 may update the display 104 to display the electronic sheet music at a current position. The device 102 may determine to update the display 104 using a variety of techniques, such as using a remote trigger (e.g., the device 102 receives user input such as contact on the display 104 or input from an external device, such as a foot pedal, an audio device, an external device displaying the electronic sheet music or the like), using preset tempos included in the electronic sheet music (e.g., the device 102 determines the tempo of the electronic sheet music and a current location and updates the current location automatically to match the tempo), audio tracking (e.g., the device 102 determines a current location using audio from a microphone) or the like.

As a first example of a remote trigger, the device 102 may receive input on a display 104 of the device indicating to update the electronic sheet music and may scroll/turn pages accordingly. As a second example of a remote trigger, the device 102 may receive input from a foot pedal coupled to the device 102 wired or wirelessly and the device 102 may scroll/turn pages based on user preferences, such as flipping a page or advancing a measure or staff. In addition to scrolling/turning pages of the device 102 based on the input from the foot pedal, the system 100 may determine a note associated with the scrolling/turning and may scroll/turn pages in a connected device. For example, a first musician may tap a foot pedal to advance a current page on a first device 102 used by the first musician. In addition to advancing from the current page to a subsequent page on the first device 102, the first device 102 may determine a current location (e.g., a first note, measure or the like displayed on the subsequent page) and transmit the current location to a second device 102 being used by a second musician. The second device 102 may display the sheet music based on the current location, despite not being connected to the foot pedal and/or a layout of the second device 102 being different than a layout of the first device 102. As a third example of a remote trigger, the device 102 may receive input from an audio device, such as Amazon Echo®, indicating a current location in the electronic sheet music. For example, the Amazon Echo® device may use the audio tracking mentioned above and described in greater detail below to determine the current location based on audio captured using a microphone. As a fourth example of a remote trigger, the device 102 may receive the current location from an external device 102 displaying the electronic sheet music. For example, multiple devices 102 may be coupled in a master-slave orientation and the master device may determine a current location and may transmit the current location to the slave devices, as will be discussed in greater detail below with regard to FIG. 13.

As a first example of a preset tempo, the device 102 may determine a number of measures per minute associated with the electronic sheet music and may update the electronic sheet music accordingly. As a second example of a preset tempo, the device 102 may determine a number of beats per measure for each measure and may update the electronic sheet music accordingly. However, the present disclosure is not limited thereto and the device 102 may determine a preset tempo using various techniques without departing from the present disclosure.

As a first example of audio tracking, the device 102 may determine a current location within the electronic sheet music using audio associated with a user of the device 102. For example, the user may be performing music associated with the electronic sheet music individually and the device 102 may capture audio data, identify the music associated with the user in the audio data and determine a current location in the electronic sheet music. Thus, the device 102 may display the electronic sheet music at a pace specified by the user, such that the current location corresponds to a note currently and/or recently played by the user. As a second example of audio tracking, the device 102 may determine a current location within the electronic sheet music using audio associated with other musicians. For example, the user may be performing music associated with the electronic sheet music with other musicians and the device 102 may capture audio data, identify the music associated with one or more of the musicians in the audio data and determine a current location in the electronic sheet music. Thus, the device 102 may display the electronic sheet music at a pace specified by the group of musicians, regardless of a current location of the user.

As a third example of audio tracking, the device 102 may determine a current location within the electronic sheet music using audio data associated with an accompaniment for the electronic sheet music. For example, the device 102 (or an external device) may play audio and/or video corresponding to the accompaniment at a pace specified by the electronic sheet music and the device 102 may determine a current location in the electronic sheet music based on the accompaniment. Thus, the device 102 may display the electronic sheet music at a pace specified by the accompaniment, regardless of a current location of a user. However, the disclosure is not limited thereto and the device 102 may instead display the electronic sheet music at a pace specified by the user and modify playback of the audio and/or video corresponding to the accompaniment accordingly, as will be discussed in greater detail below with regard to FIG. 14.

Figure 9:
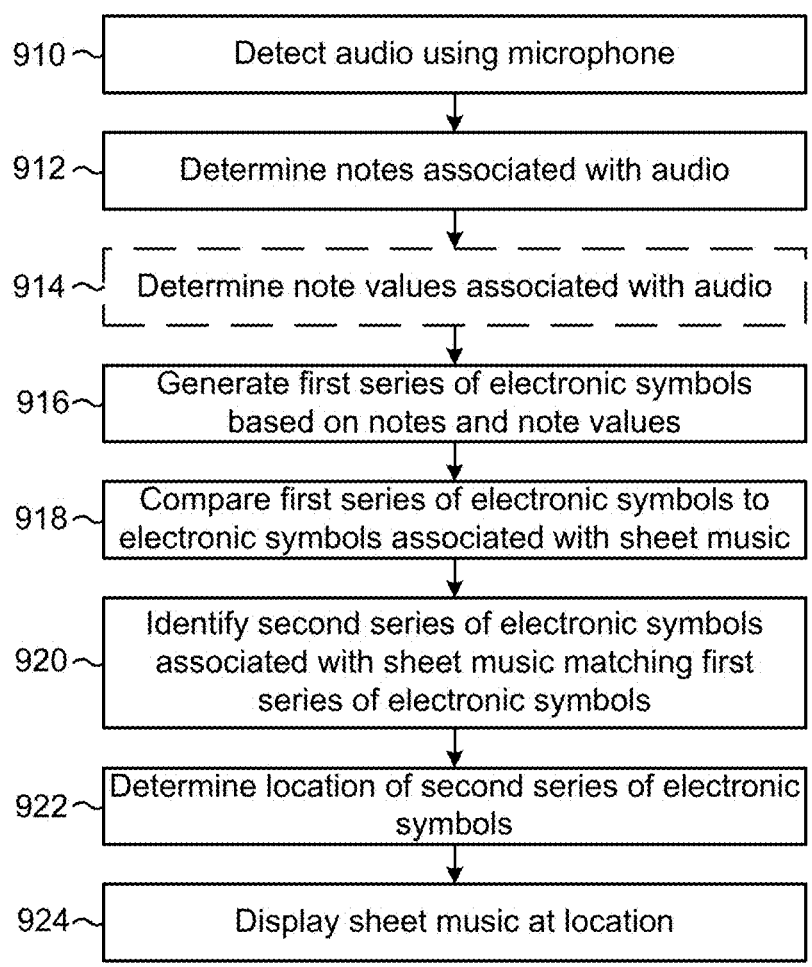
FIG. 9 is a flowchart conceptually illustrating a method of changing a display based on input from a microphone according to embodiments of the present disclosure.

FIG. 9 is a flowchart conceptually illustrating a method of changing a display based on input from a microphone according to embodiments of the present disclosure. Based on the input from the microphone, the device 102 may display a relevant portion of the electronic sheet music without direct input from a user of the device 102. Thus, the user is not required to flip between pages of the electronic sheet music while performing the electronic sheet music.

The device 102 may detect (910) audio using a microphone. The device 102 may determine (912) notes associated with the audio, such as by determining a frequency of the audio. For example, every musical note is associated with a frequency (e.g., the frequency of middle C is 261.6 Hz) and the device 102 may identify unique notes and identify the frequency associated with each unique note. The device 102 may optionally determine (914) note values associated with the audio. For example, the device 102 may determine a length of time that the note is present in the audio and compare that length of time with a value of a note (for example quarter note, half note, etc.). In a first example, the device 102 may determine the note values to limit a number of potential matches within the sheet music. In a second example, the device 102 may exclude the note values to include potential matches despite the input being slightly incorrect. In a third example, the device 102 may determine a range of note values to compensate for variations in the input audio. For example, the device 102 may determine an error margin (e.g., 0.25 seconds) and may determine the range of note values using the error margin.

The device 102 may generate (916) a first series of electronic symbols based on the notes and note values. For example, the device 102 may generate an electronic symbol including a note (e.g. pitch) and corresponding note value (e.g., duration) as data and a visual representation of the note and note value to display on the device 102 using standard musical notation. The device 102 may compare (918) the first series of electronic symbols to electronic symbols associated with the sheet music. For example, the device 102 may compare a note (e.g., a middle C (C4) note) associated with an electronic symbol from the first series of electronic symbols to notes associated with the electronic symbols in the sheet music. Additionally or alternatively, the device 102 may compare a frequency associated with the note (e.g., 261.6 Hz for a C4 note) to frequencies associated with the electronic symbols in the sheet music. The device 102 may identify (920) second series of electronic symbols associated with the sheet music matching the first series of electronic symbols. The device 102 may determine (922) a location of the second series of electronic symbols and display (924) the sheet music at the location.

For example, the device 102 may display electronic sheet music and may update a display or measures displayed based on the location of the second series of electronic symbols. Thus, a user playing an instrument may see a corresponding measure of the electronic sheet music displayed based on the notes being played by the user, or the user may see a continuous advancement of the electronic sheet music in time corresponding to the notes being played by the user.

In some embodiments, the device 102 may update the location being displayed based on timing included in the sheet music. For example, if the user is playing an instrument having a rest, the device 102 may continue to update the location based on timing associated with the rest or subsequent measures. In other embodiments, the device 102 may update the location being displayed based on a speed of the input. For example, if the user is playing faster than the electronic sheet music indicates, the device 102 may continue to update the location based on the speed of the user. The disclosure is not limited thereto and the device 102 may update the location based on any methods known to one of skill in the art to assist the user in viewing a corresponding portion of the sheet music/electronic sheet music.

The device 102 may update the display 104 using a variety of animations, such as replacing pages of the electronic sheet music (e.g., turning pages), vertically through the electronic sheet music (e.g., updating the display 104 to scroll through or replace displayed staffs of the electronic sheet music) and/or horizontally through the electronic sheet music (e.g., updating the display 104 to scroll through or replace displayed measures of the electronic sheet music).

In some examples, the sheet music may repeat the first series of notes in multiple locations. For example, a recurring theme, melody, harmony or the like may be played by one or more instruments multiple times. Therefore, the device 102 may require additional input to determine which instance of the first series of notes corresponds to the current location in the sheet music. In a first example, a user of the device 102 may input a starting location in the sheet music (e.g., the user may specify a measure number, rehearsal letter, individual note or the like) prior to the device 102 determining the current location. Thus, the device 102 may identify the first series of notes subsequent to the starting location as the current location in the sheet music and may continually update the current location based on previously played notes.

In a second example, the device 102 may select the first series of notes based on user preferences and/or starting locations determined by the device 102. For example, the device 102 may substitute a beginning of the sheet music as the starting location and may identify the first series of notes subsequent to the beginning of the sheet music as the current location. Additionally or alternatively, the device 102 may determine a duration of time from a beginning of the audio data and may identify the first series of notes using the duration of time. Thus, an end of the first series of notes may correspond to a twenty second mark in the audio data and the device 102 may select the first series of notes occurring twenty seconds after a transition (e.g., a beginning of the sheet music, a rehearsal letter, etc. that is associated with a transition in the sheet music).

In a third example, the device 102 may receive additional audio input and/or an additional series of notes from remote devices (e.g., additional devices 102 or the like) and may determine the current location in the sheet music based on the audio input to the device 102 and the additional audio input/additional series of notes. For example, a first device 102 may record audio associated with a first instrument and a second device 102 may record audio associated with a second instrument. The first device 102, the second device 102 and/or a remote device (e.g., a server) may determine a first series of notes associated with the first instrument and a second series of notes associated with the second instrument and therefore determine a current location including the first series of notes and the second series of notes.

In some examples, the device 102 may include a practice mode for practicing the sheet music. When in the practice mode, the device 102 may compare the first series of notes to a previously played series of notes to determine if the musician is repeating a portion of the sheet music. For example, the musician may play the first series of notes and then make a mistake, replaying the first series of notes a second time. The device 102 may recognize the repetition and determine the current location even when the current location was previously played. For example, when the musician finishes the first series of notes, plays a second series of notes and then repeats the first series of notes, the device 102 may determine the current location as the beginning of the first series of notes. Thus, the device 102 may repeat portions of the sheet music instead of jumping ahead to a subsequent iteration of the series of notes.

FIG. 10 illustrates an example of turning pages in electronic sheet music according to embodiments of the present disclosure. As illustrated in FIG. 10, the device 102 may display first electronic sheet music 1010-1 (e.g., a first page) including measures 3-6 at a first time and then transition to displaying second electronic sheet music 1010-2 (e.g., a second page) including measures 7-10 at a second time. This animation corresponds to turning pages of physical sheet music or incrementing images of sheet music, although the electronic sheet music is reflowable and can may be magnified or modified based on user preferences.

Figure 11B:
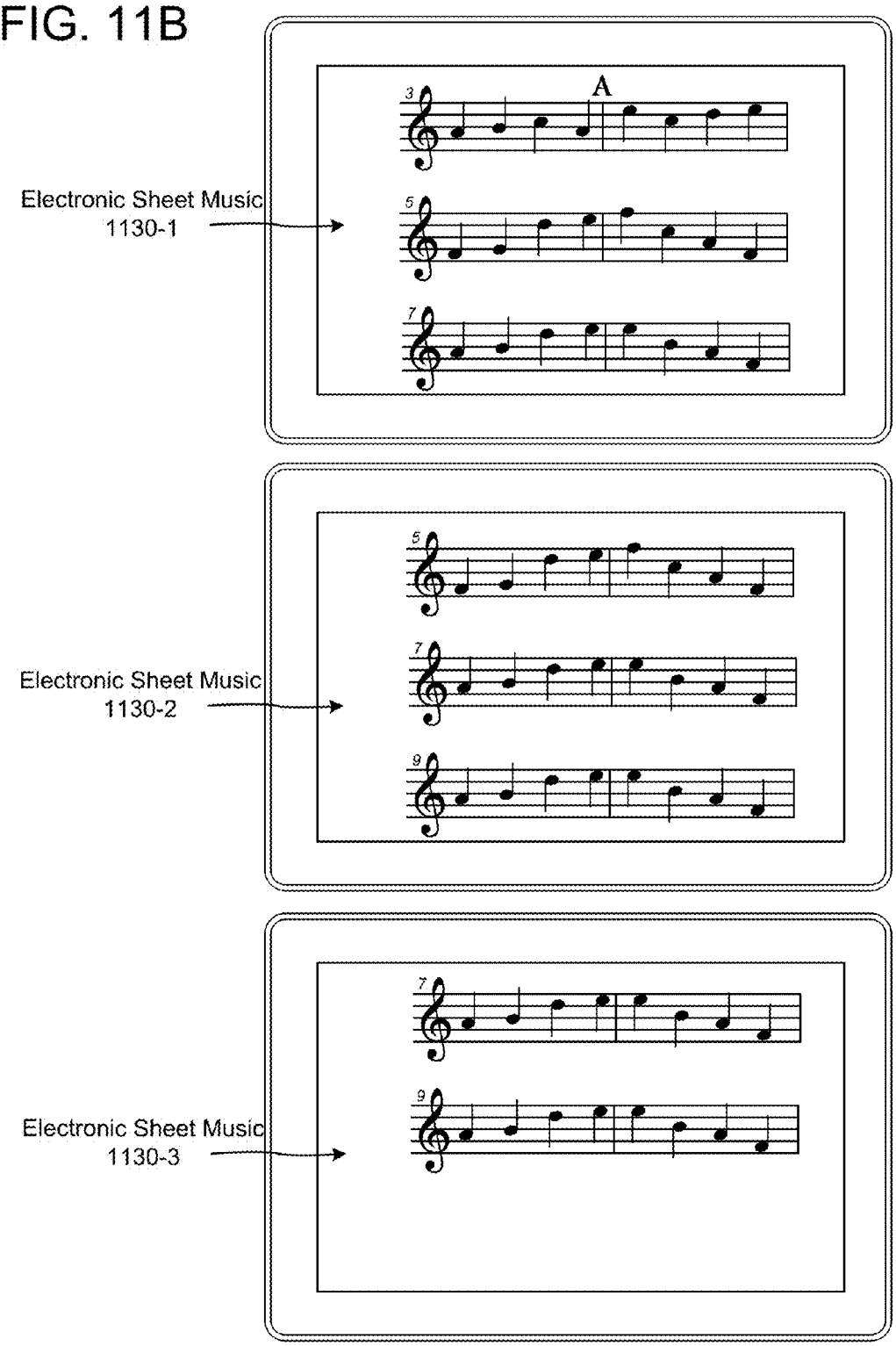
Figure 11C:
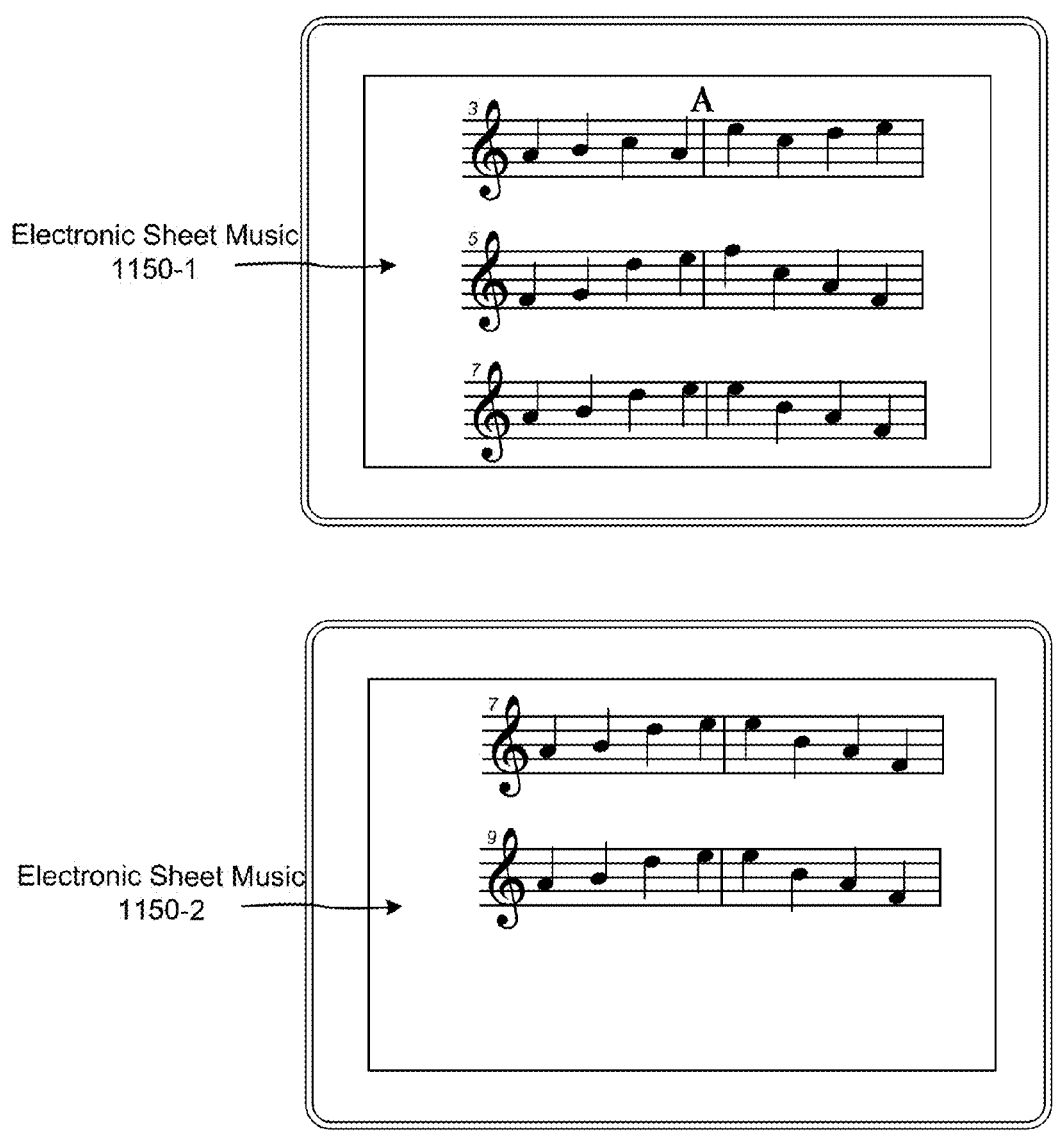

FIG. 11A-11C illustrate examples of scrolling vertically through electronic sheet music according to embodiments of the present disclosure. As illustrated in FIG. 11A, the device 102 may display first electronic sheet music 1110-1 including measures 3-8 at a first time, second electronic sheet music 1110-2 including portions of measures 3-10 at a second time and third electronic sheet music 1110-3 including measures 5-10 at a third time. Thus, the device 102 may determine a layout of the electronic sheet music as described in greater detail above, display the electronic sheet music and scroll vertically through the electronic sheet music based on a current location, user input or the like. For example, the first electronic sheet music 1110-1 may display three staffs, a first staff (including measures 3-4), a second staff (including measures 5-6) and a third staff (including measures 7-8). As the current location advances within the electronic sheet music, the device 102 may scroll downwards in the electronic sheet music, moving the first, second and third staffs vertically upwards in the display 104 while displaying a portion of a fourth staff (including measures 9-10) at a bottom of the display 104, as illustrated by the second electronic sheet music 1110-2. Similarly, the device 102 may scroll downwards in the electronic sheet music, moving the second, third and fourth staffs vertically upwards in the display 104 to display an entirety of the fourth staff at the bottom of the display 104, as illustrated by the third electronic sheet music 1110-3. As the electronic sheet music is reflowable, the device 102 may scroll vertically through an entirety of the electronic sheet music without transitions or interruptions caused by advancing from a first page to a second page in physical sheet music or images of sheet music.

As illustrated in FIG. 11B, the device 102 may display first electronic sheet music 1130-1 including measures 3-8 at a first time, second electronic sheet music 1130-2 including measures 5-10 at a second time and third electronic sheet music 1130-3 including measures 7-10 at a third time. Thus, the device 102 may determine a layout of the electronic sheet music as described in greater detail above, display the electronic sheet music and replace individual staffs displayed on the display 104 based on a current location, user input or the like. For example, the first electronic sheet music 1130-1 may display three staffs, a first staff (including measures 3-4), a second staff (including measures 5-6) and a third staff (including measures 7-8). As the current location advances within the electronic sheet music, the device 102 may shift the second and third staffs vertically upwards and add a fourth staff (including measures 9-10) at a bottom of the display 104, as illustrated by the second electronic sheet music 1130-2, effectively replacing the first staff with the fourth staff. Similarly, the device 102 may shift the third and fourth staffs vertically upwards, as illustrated by the third electronic sheet music 1130-3. As the electronic sheet music is reflowable, the device 102 may replace staffs through an entirety of the electronic sheet music without transitions or interruptions caused by advancing from a first page to a second page in physical sheet music or images of sheet music.

In some embodiments, the device 102 may have a limited refresh rate and animations may therefore be less smooth. For example, while a tablet device may have a relatively fast refresh rate (e.g., refresh rate of 60 Hz or the like), an e-reader device may have a relatively slow refresh rate (e.g., refresh rate of 5 Hz or the like). Thus, animations corresponding to a current location in the electronic sheet music may be less smooth using the slower refresh rate and may degrade a user experience. To improve a user experience, different animations may be used for devices having slower refresh rates. For example, the device 102 may advance through the electronic sheet music using uniform transitions, such as displaying multiple staffs until the current location corresponds to a final staff at the bottom of the display 104, at which point the device 102 may shift the final staff to a top of the display 104 and include additional staffs.

As illustrated in FIG. 11C, the device 102 may display first electronic sheet music 1150-1 including measures 3-8 at a first time and second electronic sheet music 1150-2 including measures 7-10 at a second time. Thus, the device 102 may determine a layout of the electronic sheet music as described in greater detail above, display the electronic sheet music and modify a location of the staffs in the display 104 based on a current location, user input or the like. For example, the first electronic sheet music 1150-1 may display three staffs, a first staff (including measures 3-4), a second staff (including measures 5-6) and a third staff (including measures 7-8). As the current location advances within the electronic sheet music to the second staff, the device 102 may continue displaying the first electronic sheet music 1150-1. However, once the current location advances to the third staff, the device 102 may shift the third staff vertically upwards and add a fourth staff (including measures 9-10), as illustrated by the second electronic sheet music 1150-2. Thus, the device 102 always displays the current location within the electronic sheet music and incrementally transitions to display additional staffs as necessary.

When the device 102 displays multiple staffs per instrument at a time, the device 102 may scroll vertically through the electronic sheet music, as discussed above with regard to FIGS. 11A-11C. However, when the device 102 displays a single staff per instrument at a time, the device 102 may scroll horizontally through the electronic sheet music. FIG. 12A-12B illustrate examples of scrolling horizontally through electronic sheet music according to embodiments of the present disclosure.

As illustrated in FIG. 12A, the device 102 may display first electronic sheet music 1210-1 including measures 3-4 and a portion of measure 5 at a first time, second electronic sheet music 1210-2 including measures 5-6 and a portion of measure 7 at a second time and third electronic sheet music 1210-3 including a portion of measure 6 and measures 7-8 at a third time. Thus, the device 102 may determine a layout of the electronic sheet music as described in greater detail above, display the electronic sheet music and scroll horizontally through the electronic sheet music based on a current location, user input or the like. For example, the device 102 may scroll to the right within the electronic sheet music based on the current location, such that the current location is always displayed at a first position on the display 104. As the electronic sheet music is reflowable, the device 102 may horizontally scroll through an entirety of the electronic sheet music without transitions or interruptions caused by advancing from a first page to a second page in physical sheet music or images of sheet music.

As illustrated in FIG. 12B, the device 102 may horizontally scroll through the electronic sheet music using a warp effect to include additional context for a user of the device 102. For example, the device 102 may display first electronic sheet music 1230-1 including measures 3-6 at a first time (with measures 4-5 displayed at full magnification and measures 3 and 6 displayed at a smaller magnification), second electronic sheet music 1230-2 including measures 4-7 (with measures 5-6 displayed at full magnification and measures 4 and 7 displayed at a smaller magnification) at a second time and third electronic sheet music 1230-3 including measures 5-8 (with measures 6-7 displayed at full magnification and measures 5 and 8 displayed at a smaller magnification) at a third time. Thus, the device 102 may scroll horizontally through the electronic sheet music based on a current location, user input or the like, with current measures (e.g., measures in proximity to the current location) displayed at full magnification and contextual measures (e.g., measures greater than a first distance before the current location and/or a second distance after the current location) displayed at a smaller magnification. By displaying the contextual measures at the smaller location, the device 102 may display additional information to the user to provide context or indicators of notes to come. For example, the device 102 may scroll to the right within the electronic sheet music based on the current location, such that the current location is always displayed at a first position on the display 104, with previous contextual measures (e.g., measures greater than the first distance before the current location) displayed at a second position to the left of the first position and upcoming contextual measures (e.g., measures greater than the second distance following the current location) displayed at a third position to the right of the first position. As the electronic sheet music is reflowable, the device 102 may horizontally scroll through an entirety of the electronic sheet music without transitions or interruptions caused by advancing from a first page to a second page in physical sheet music or images of sheet music.

While FIG. 12B illustrates the warp effect being applied while scrolling horizontally, the present disclosure is not limited thereto and the device 102 may apply the warp effect while scrolling vertically without departing from the present disclosure. For example, the device 102 may display a first staff at a top of the display 104 as a previous contextual staff (e.g., a staff greater than a first distance above the current location that is displayed at a smaller magnification), a second staff and a third staff in proximity to the current location as current staffs (e.g., displayed at full magnification) and a fourth staff at a bottom of the display 104 as an upcoming contextual staff (e.g., a staff greater than a second distance below the current location that is displayed at the smaller magnification).

As discussed above, multiple devices 102 may be coupled to display a current location within electronic sheet music for multiple users (e.g., musicians). For example, each musician in an orchestra, band, string quartet or the like may view electronic sheet music on an individual device 102 and the current location within the electronic sheet music may be updated from a single device 102, external device (e.g., foot pedal, audio device or the like) or the like. For example, a first musician may tap a foot pedal to advance a current page on a first device 102 used by the first musician. In addition to advancing from the current page to a subsequent page on the first device 102, the first device 102 may determine a current location (e.g., a first note, measure or the like displayed on the subsequent page) and transmit the current location to a second device 102 being used by a second musician. The second device 102 may display the sheet music based on the current location, despite not being connected to the foot pedal and/or a layout of the second device 102 being different than a layout of the first device 102 (e.g., two page turns on the first device 102 results in one page turn on the second device 102, or the like). However, the present disclosure is not limited thereto and the devices 102 may display different locations within the electronic sheet music and/or determine a current location using various techniques.

While different devices 102 may display the same current location in the electronic sheet music, the devices 102 may display the electronic sheet music using individual layouts or user preferences. FIG. 13 illustrates an example of a multi-device system displaying electronic sheet music according to embodiments of the present disclosure. As illustrated in FIG. 13, a first user 10-1 (e.g., first violin) may use a first device 102-1 displaying first electronic sheet music 1310-1 while a second user 10-2 (e.g., second violin) may use a second device 102-2 displaying second electronic sheet music 1310-2. While the first electronic sheet music 10-1 and the second electronic sheet music 10-2 include the same notes, the first user 10-1 may prefer a first layout (e.g., two measures per staff, three staffs per page, scrolling vertically) while the second user 10-2 may prefer a second layout (e.g., one staff per page, scrolling horizontally). Thus, the devices 102 may adaptively determine a layout to display the electronic sheet music based on user preferences.

The layout for each device 102 may be determined based on a size of the device 102 and/or a magnification (e.g., zoom). For example, a first device 102 with a relatively small display 104 may use a larger magnification (e.g., display larger electronic symbols) compared to a second device 102 with a relatively large display 104, which may use a smaller magnification (e.g., display smaller electronic symbols). While a layout of the first device 102 may be different than a layout of the second device 102, the sheet music displayed by each of the first device 102 and the second device 102 may be a smaller portion of the overall sheet music and may include electronic symbols displayed in sequence. Thus, the first device 102 is displaying a desired amount of sheet music for a first musician and the second device 102 is displaying a desired amount of sheet music for a second musician (or the first musician), unlike a fixed layout (e.g., PDF or image of sheet music) that omits portions of the sheet music when magnified above a threshold.

A user of the device 102 may perform music using electronic sheet music and may be accompanied by one or more accompanying instruments. While the examples discussed above refer to the one or more accompanying instruments being in proximity to the device 102 (e.g., in an environment such as a band, orchestra, string quartet or the like), the present disclosure is not limited thereto. Instead, the one or more accompanying instruments may be remote to the device 102 in real-time (e.g., performing remotely via the internet) or may be simulated using audio and/or video data recorded at a previous time without departing from the present disclosure.

Figure 14:
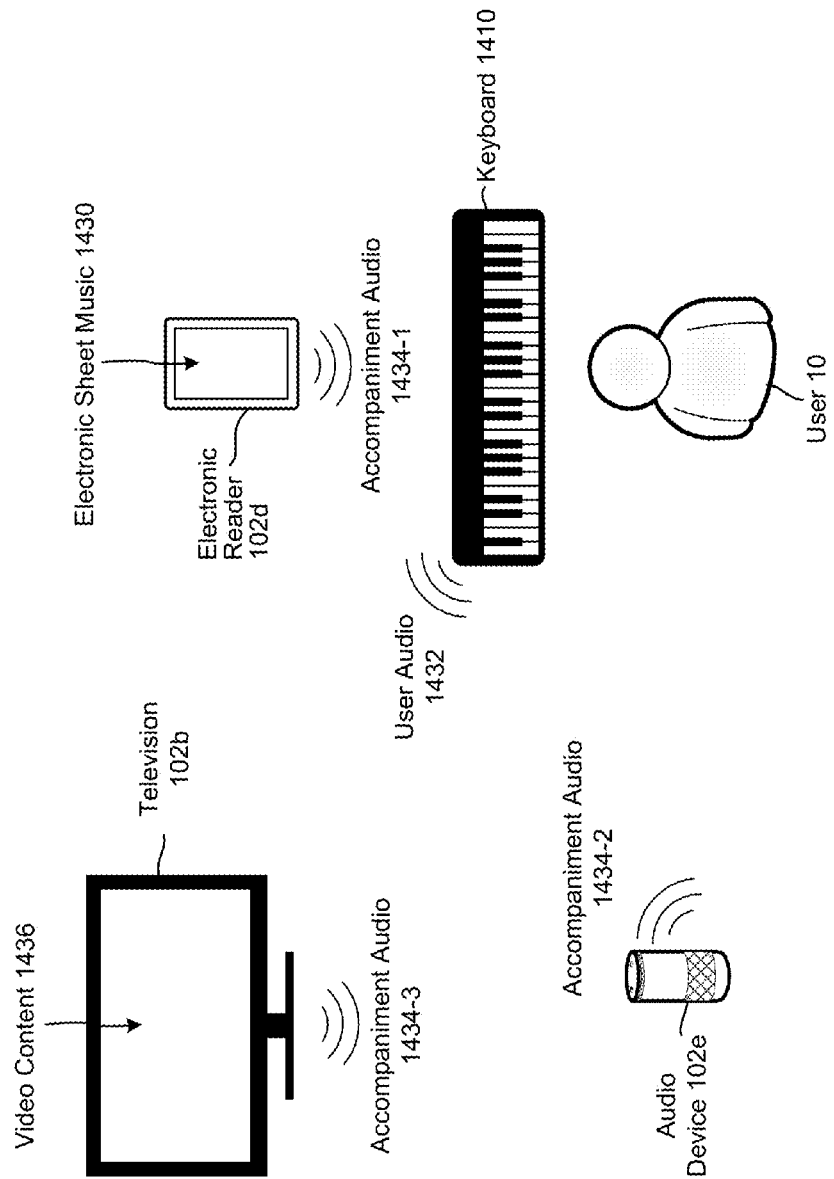
FIG. 14 illustrates an example of a multi-device system displaying electronic sheet music with accompaniment according to embodiments of the present disclosure.

FIG. 14 illustrates an example of a multi-device system displaying electronic sheet music with accompaniment according to embodiments of the present disclosure. As illustrated in FIG. 14, a user 10 may play a keyboard 1410 using electronic sheet music 1430 displayed by an electronic reader 102*d*. The keyboard 1410 may produce user audio 1432 which may be detected by the devices 102. In various embodiments, the devices 102 may play one or more of first accompaniment audio 1434-1, second accompaniment audio 1434-2, third accompaniment audio 1434-3 or video content 1436.

In some embodiments, the one or more accompanying instruments may be simulated using audio and/or video data recorded at a previous time. In a first example, the electronic reader 102*d* may display the electronic sheet music 1430 while playing first accompaniment audio data 1434-1 corresponding to the electronic sheet music, which includes the one or more accompanying instruments. The electronic reader 102*d* may display the electronic sheet music 1430 based on the first accompaniment audio 1434-1 (e.g., determine the current location in the electronic sheet music 1430 based on a current moment in the first accompaniment audio 1434-1, using a fixed tempo or the like) or may play the first accompaniment audio 1434-1 based on the current location in the electronic sheet music 1430 (e.g., capture the user audio 1432 to determine the current location in the electronic sheet music 1430 and control a timing of the first accompaniment audio 1434-1 to match the current location).

In a second example, the electronic reader 102*d* may display the electronic sheet music 1430 while the audio device 102*e* plays the second accompaniment audio data 1434-2. Similar to the first example discussed above, the device 102 may display the electronic sheet music 1430 based on a current moment in the second accompaniment audio 1434-2 or the audio device 102*e* may play the second accompaniment audio 1434-2 based on the current location in the electronic sheet music 1430.

In some embodiments, the electronic reader 102*d* may play the first accompaniment audio 1434-1 while the keyboard 1410 plays the user audio 1432 and the audio device 102*e* plays the second accompaniment audio 1434-2. The electronic reader 102*d* and/or the audio device 102*e* may distinguish the user audio 1432 from the first accompaniment audio 1434-1 and the second accompaniment audio 1434-2. For example, the electronic reader 102*d* and/or the audio device 102*e* may play the first accompaniment audio 1434-1 and/or the second accompaniment audio 1434-2 using data including multiple tracks, such as a first track corresponding to the first accompaniment audio 1434-1, a second track corresponding to the second accompaniment audio 1434-2 and a third track corresponding to the user audio 1432. While the electronic reader 102*d* and/or the audio device 102*e* may capture more than the user audio 1432, the electronic reader 102*d* and/or the audio device 102*e* may use the third track to identify the user audio 1432.

In a third example, the electronic reader 102*d* may display the electronic sheet music 1430 while the electronic reader 102*d* plays the first accompaniment audio 1434-1, the audio device 102*e* plays the second accompaniment audio data 1434-2 and/or the television 102*b* plays the third accompaniment audio 1434-3 and/or video content 1436. For example, the television 102*b* may play video content 1436 representing a famous musician playing the third accompaniment audio 1434-3. Similar to the first example discussed above, the electronic reader 102*d* may display the electronic sheet music 1430 based on a current moment in the accompaniment audio 1434 (one of the first accompaniment audio 1434-1, the second accompaniment audio 1434-2 or the third accompaniment audio 1434-3) or the devices 102 may play the accompaniment audio 1434 based on the current location in the electronic sheet music 1430.

The devices 102 may distinguish the user audio 1432 from the accompaniment audio 1434. For example, the devices 102 may play the accompaniment audio 1434 using data including multiple tracks, such as a first track corresponding to the first accompaniment audio 1434-1, a second track corresponding to the second accompaniment audio 1434-2, a third track corresponding to the third accompaniment audio 1434-3 and a fourth track corresponding to the user audio 1432. While the devices 102 may capture more audio data than the user audio 1432, the devices 102 may compare captured audio data to the fourth track to identify the user audio 1432.

In some embodiments, the audio device 102e may communicate with the electronic reader 102d and/or the television 102b to control a timing of the accompaniment audio 1434, the corresponding video content 1436 and/or the electronic sheet music 1430. For example, the audio device 102e may control a current moment in the accompaniment audio 1434 and may transmit the current moment (or a corresponding current location in the electronic sheet music 1430) to the electronic reader 102d and/or the television 102b. Thus, the audio device 102e may control a timing of the accompaniment audio 1434, the corresponding video content 1436 and/or the electronic sheet music 1430 based on the accompaniment audio 1434. Additionally or alternatively, the audio device 102e may capture the user audio 1432, determine the current location in the electronic sheet music 1430 and transmit the current location to the electronic reader 102d and/or the television 102b. Thus, the audio device 102e may control a timing of the accompaniment audio 1434 (and corresponding video content 1436) and/or the electronic sheet music 1430 based on the user audio 1432.

As part of controlling the timing, the audio device 102e may speed up or slow down a playback of the accompaniment audio 1434 or portions of the accompaniment audio 1434. For example, a first tempo of the user audio 1432 may be slower than a second tempo of the accompaniment audio 1434 and the audio device 102e may determine a current location in the electronic sheet music 1430 (and corresponding current moment in the accompaniment audio 1434) and a current playback speed of the user audio 1432. The devices 102 may play the accompaniment audio 1434 using the current playback speed such that the second tempo of the accompaniment audio 1434 matches the first tempo associated with the user audio 1432. Additionally or alternatively, the audio device 102e may control a playback speed for each of the first accompaniment audio 1434-1, the second accompaniment audio 1434-2 and/or the third accompaniment audio 1434-3 to compensate for latency or delay between the devices 102. Thus, the user 10 may experience full accompaniment even when not playing the electronic sheet music 1430 with an intended tempo and/or latency associated with playback of the accompaniment audio 1434. However, the present disclosure is not limited thereto and the electronic reader 102d and/or the television 102b may control the timing as described above with regard to the audio device 102e. Further, the electronic reader 102d and/or the television 102b may play the accompaniment audio 1434 without communicating with the audio device 102e.

In some embodiments, the one or more accompanying instruments may be remote to the device 102 in real-time (e.g., performing remotely via the internet). For example, one or more musicians may perform remotely and the television 102b may play the third accompaniment audio 1434-3 and/or the video content 1436 representing the remote performance while the user 10 plays along on the keyboard 1410 using the electronic sheet music 1430 displayed by the electronic reader 102d. As discussed in greater detail above, one of the audio device 102e, the television 102b or the electronic reader 102d may control a timing (e.g., current moment, current location and/or current playback speed) of each of the electronic sheet music 1430, the third accompaniment audio 1434-3 and/or the video content 1436 to synchronize the electronic sheet music 1430, the third accompaniment audio 1434-3 and/or the video content 1436 despite latency between the television 102b, the electronic reader 102d, the audio device 102e and/or the keyboard 1410.

As a first example, the third accompaniment audio 1434-3 may lag behind the user audio 1432 due to the third accompaniment audio 1434-3 being performed remotely. One of the devices 102 may determine a first acoustical fingerprint (associated with a first timestamp) from the third accompaniment audio 1434-3, determine a first location in the electronic sheet music 1430 based on the first acoustical fingerprint, determine a second acoustical fingerprint (associated with a second timestamp) from the user audio 1432, determine a second location in the electronic sheet music 1430 based on the second acoustical fingerprint and determine a time delay between the first timestamp and the second timestamp. Based on the time delay, the devices 102 may synchronize the third accompaniment audio 1434-3 with the user audio 1432. For example, if the third accompaniment audio 1434-3 is buffered, the television 102b may skip ahead based on the time delay or increase a playback speed of the third accompaniment audio 1434-3 until the third accompaniment audio 1434-3 is synchronized with the user audio 1432. Additionally or alternatively, the electronic reader 102d may display the electronic sheet music 1430 slower until the time delay is eliminated.

As a second example, a first tempo of the user audio 1432 may be different than a second tempo of the third accompaniment audio 1434-3 and the devices 102 may determine the difference between the first tempo and the second tempo using acoustical fingerprints as discussed above. To compensate for the difference between the first tempo and the second tempo, the television 102b may control a playback speed of the third accompaniment audio 1434-3 to match the first tempo. Additionally or alternatively, the electronic reader 102d may display the electronic sheet music 1430 based on the second tempo to encourage the user 10 to play at the second tempo.

While not illustrated in FIG. 14, the devices 102 may playback additional audio accompaniment from additional musicians, previously recorded audio or a combination of the two without departing from the disclosure. Thus, the devices 102 may control a timing to synchronize multiple sources of audio data to match the first tempo of the user audio 1432 or the electronic reader 102d may control a current location in the electronic sheet music 1430 to match the second tempo of the audio accompaniment 1434.

Figure 15A:
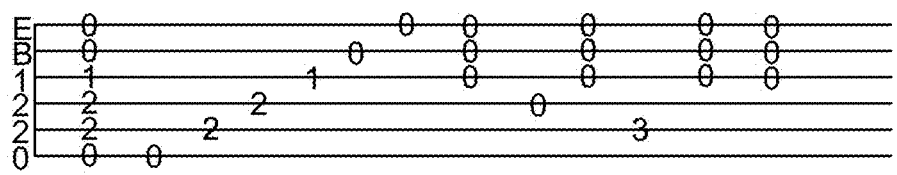
FIGS. 15A-15C illustrate examples of alternative musical notation that may be used with the present system.
Figure 15B:
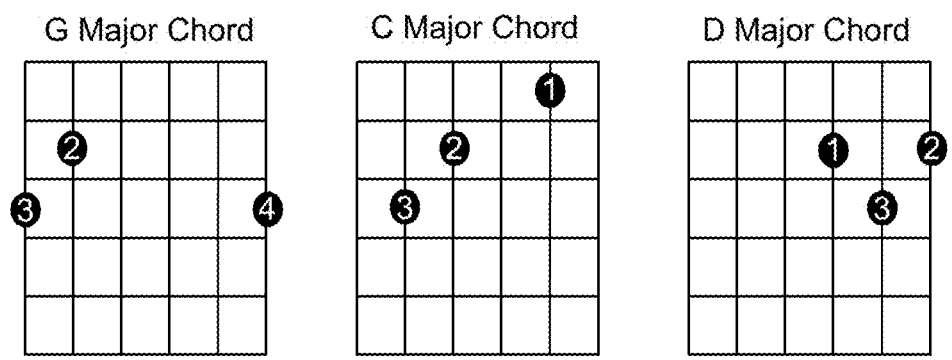
Figure 15C:
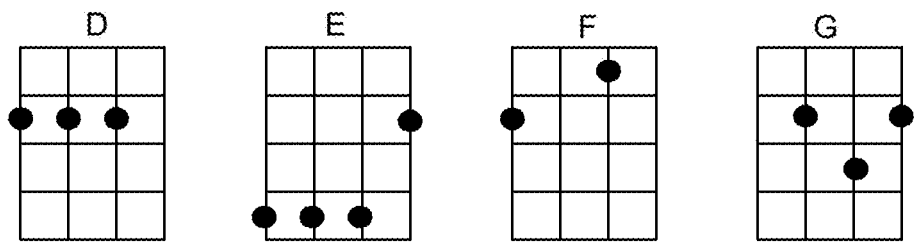

While the disclosure has illustrated examples using modern staff notation, the disclosure is not limited thereto. Instead, device 102 may display any musical notation, such as percussion notation, figured bass notation, lead sheet notation, chord chart notation, shape note notation, tablature or the like. FIGS. 15A-15C illustrate examples of alternative musical notation that may be used with the present system. For example, FIG. 15A illustrates an example of guitar tablature, FIG. 15B illustrates examples of guitar chord charts and FIG. 15C illustrates examples of ukulele chord charts. FIGS. 15A-15C are intended to illustrate some examples of alternative musical notation, but the present disclosure is not limited thereto and may be used with a variety of musical notation schemes.

As shown in FIG. 16, multiple devices may be connected over a network 1620. The network 1620 may include a local or private network or may include a wide network such as the internet. Devices may be connected to the network 1620 through either wired or wireless connections. For example, a smart phone 102c may be connected to the network 1620 through a wireless service provider. Other devices, such as tablet computer 102a, television 102b, electronic reader 102d, audio device 102e, server 1602 and/or keyboard 1410, may connect to the network 1620 through a wired connection. The server 1602 may be configured to receive, store, and manage data related to electronic sheet music and/or electronic musical symbol functionality executed in one or more of the tablet computer 102a, television 102b, smart phone 102c, electronic reader 102d, audio device 102e, etc. For example, the server 1602 may perform any of the steps described above with regard to FIGS. 1, 3, 6 and/or 9. Alternatively, the server 1602 may receive and store data generated by the tablet computer 102a, television 102b, smart phone 102c, electronic reader 102d, audio device 102e, etc. using any of the steps described above. Thus, the server 1602 may maintain data, images of sheet music and/or electronic sheet music to allow convenient access to any of the devices connected to the server 1602. Additionally or alternatively, the server 1602 may determine a current location in the sheet music based on one or more inputs. In a first example, the server 1602 may receive a first input from one of the tablet computer 102a, television 102b, smart phone 102c, electronic reader 102d or audio device 102e and may determine the current location in the sheet music based on the first input. In a second example, the server may receive a plurality of inputs from two or more of the tablet computer 102a, television 102b, smart phone 102c, electronic reader 102d and/or audio device 102e and may determine the current location in the sheet music based on the plurality of inputs. Thus, the server 1602 may determine a series of electronic symbols associated with each of two or more instruments and determine the current location in the sheet music using the series of electronic symbols associated with each of the two or more instruments.

FIG. 17 is a block diagram conceptually illustrating example components of the computing device 102. In operation, the computing device 102 may include computer-readable and computer-executable instructions that reside on the computing device 102, as is discussed further below.

As illustrated in FIG. 17, the computing device 102 may include an address/data bus 1702 for conveying data among components of the computing device 102. Each component within the computing device 102 may also be directly connected to other components in addition to (or instead of) being connected to other components across the bus 1702.

The computing device 102 may include one or more microcontrollers/controllers/processors 1704 that may each include a central processing unit (CPU) for processing data and computer-readable instructions, and a memory 1706 for storing data and instructions. The memory 1706 may include volatile random access memory (RAM), non-volatile read only memory (ROM), non-volatile magnetoresistive (MRAM) and/or other types of memory. The computing device 102 may also include a data storage component 1708, for storing data and microcontrollers/controller/processor-executable instructions (e.g., instructions to perform one or more steps of the methods illustrated in and described with reference to FIGS. 1, 3, 6 and/or 9). The data storage component 1708 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through input/output device interfaces 1710.

Computer instructions for operating the computing device 102 and its various components may be executed by the microcontroller(s)/controller(s)/processor(s) 1704, using the memory 1706 as temporary "working" storage at runtime. The computer instructions may be stored in a non-transitory manner in non-volatile memory 1706, storage 1708, or an external device. Alternatively, some or all of the executable instructions may be embedded in hardware or firmware in addition to or instead of software.

The computing device 102 includes input/output device interfaces 1710. A variety of components may be connected through the input/output device interfaces 1710, such as the display or display screen 104 (which may have a touch surface or touchscreen); an audio output device for producing sound, such as speaker(s) 1712; one or more audio capture device(s), such as a microphone or an array of microphones 1714; and other components. The display 104, speaker(s) 1712, microphone(s) 1714, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104, as described above.

The input/output device interfaces 1710 may also include an interface for an external peripheral device connection such as universal serial bus (USB), FireWire, Thunderbolt, Ethernet port or other connection protocol that may connect to networks 1620. The input/output device interfaces 1710 may also include a connection to antenna 1722 to connect one or more networks 1620 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The computing device 102 further includes a sheet music module 1724 and an audio module 1726 that may perform the steps described above with regard to FIGS. 1, 3, 6 and/or 9. Some or all of the controllers/modules of the sheet music module 1724 and the audio module 1726 may be executable instructions that may be embedded in hardware or firmware in addition to, or instead of, software. In one embodiment, the computing device 102 may operate using an Android® operating system (such as, Android® 4.3 Jelly Bean and/or Android® 4.4 KitKat), Amazon® operating system (such as FireOS) or the like.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of displaying sheet music on an electronic device, the method comprising:
   receiving sheet music data, the sheet music data comprising an electronic representation of sheet music;
   receiving input on a display of a device indicating a starting location in the sheet music data;
   determining first audio data using a microphone of the device, the first audio data corresponding to music detected by the device;
   determining a first audio note from the first audio data, wherein the determining further comprises identifying a frequency associated with a first portion of the first audio data and determining a musical note corresponding to the frequency;
   comparing the first audio note to a plurality of sheet music notes included in the sheet music data after the starting location;
   determining a first sheet music note in the plurality of sheet music notes, corresponding to the first audio note, a frequency of the first sheet music note substantially similar to a frequency of the first audio note;
   determining a first layout of the sheet music data for the display, the first layout including the first sheet music note, wherein the determining further comprises identifying a first number of measures in a horizontal direction and a second number of staffs in a vertical direction using the resolution of the display and an orientation of the device; and
   displaying a visual representation of the sheet music data using the first layout on the display.

2. The computer-implemented method of claim 1, further comprising, by a second device:
   receiving a first location associated with the first sheet music note;
   determining a second sheet music note in a second portion of the sheet music data corresponding to the first location, the second portion of the sheet music associated with a second instrument;
   determining a second layout of the second portion of the sheet music data for a second display of the second device, the second layout including the second sheet music note, wherein the determining further comprises identifying a third number of measures in a horizontal direction and a fourth number of staffs in a vertical direction using a resolution of the second display and an orientation of the second device; and
   displaying a visual representation of the second portion of the sheet music data using the second layout on the second display.

3. The computer-implemented method of claim 1, further comprising:
   displaying a first visual representation of the first sheet music note using a first magnification at a first position on the display, and
   displaying a second visual representation of the first sheet music note using a second magnification at a second position on the display, the second magnification different than the first magnification.

4. The computer-implemented method of claim 1, further comprising:
   determining a first timestamp associated with the first audio note in the first audio data;
   determining a period of time from the first timestamp to a current time;
   determining a second timestamp in audio accompaniment data corresponding to the first sheet music note in the sheet music, the audio accompaniment data associated with the sheet music data and including music played by an accompanying instrument;
   determining a third timestamp by summing the second timestamp and the period of time; and
   playing the audio accompaniment data beginning at the third timestamp.

5. A computer-implemented method of displaying sheet music on a device, the method comprising:
   receiving sheet music data, the sheet music data comprising an electronic representation of sheet music;
   determining first audio data using a microphone;
   determining a first audio note from the first audio data;
   determining a second audio note from the first audio data, the second audio note following the first audio note;
   comparing the first audio note and the second audio note to a plurality of sheet music notes included in the sheet music data;
   determining a first sheet music note from the plurality of sheet music notes, the first sheet music note corresponding to the first audio note;
   determining a second sheet music note from the plurality of sheet music notes, the second sheet music note following the first sheet music note and corresponding to the second audio note;
   displaying a visual representation of the sheet music data including a visual representation of the first sheet music note and a visual representation of the second sheet music note;

determining a first timestamp associated with the first audio note in the first audio data;

determining a period of time from the first timestamp to a current time;

determining a second timestamp in audio accompaniment data corresponding to the first sheet music note in the sheet music data, the audio accompaniment data associated with the sheet music data;

determining a third timestamp by summing the second timestamp and the period of time; and playing the audio accompaniment data at the third timestamp.

6. The computer-implemented method of claim 5, further comprising:

determining a first layout of the sheet music data for the device using a resolution of a display of the device and an orientation of the device; and displaying the visual representation of the sheet music data further comprises displaying the visual representation of the sheet music data including the visual representation of the first sheet music note and the visual representation of the second sheet music note using the first layout.

7. The computer-implemented method of claim 6, further comprising, by a second device:

receiving a first location associated with the first sheet music note;

determining a third sheet music note in a second portion of the sheet music data corresponding to the first location;

determining a second layout of the sheet music data for a second display of the second device using a resolution of the second display and an orientation of the second device, the second layout including the third sheet music note; and displaying the visual representation of the sheet music data including the visual representation of the first sheet music note and the visual representation of the second sheet music note using the second layout on the second display.

8. The computer-implemented method of claim 6, wherein determining the first layout further comprises:

determining a first magnification associated with user preferences;

determining a first number of measures per staff based on the resolution, the orientation and the first magnification; and determining a second number of staffs to display based on the resolution, the orientation and the first magnification, wherein the first layout includes the first number of measures per staff in a horizontal direction and the second number of staffs in a vertical direction.

9. The computer-implemented method of claim 5, wherein displaying the sheet music data further comprises:

displaying, at a first time, a first plurality of staffs ending with a final staff at a first a vertical position on a display of the device at a first time; and displaying, at a second time, a second plurality of staffs beginning with the final staff.

10. The computer-implemented method of claim 5, wherein displaying the sheet music data further comprises:

displaying a visual representation of the first musical note at a first position on a staff at a first time, and displaying the visual representation of the first musical note at a second position on the staff to the left of the first position at a second time after the first time.

11. The computer-implemented method of claim 5, wherein displaying the sheet music data further comprises:

displaying a first visual representation of the first sheet music note using a first magnification at a first position on the display; and displaying a second visual representation of the first music note using a second magnification at a second position on the display, the second magnification different than the first magnification.

12. A system, comprising:

a device including at least one processor;

a memory device including instructions operable to be executed by the at least one processor to configure the device for:

receiving sheet music data, the sheet music data comprising an electronic representation of sheet music;

determining first audio data using a microphone;

determining a first audio note from the first audio data;

determining a second audio note from the first audio data, the second audio note following the first audio note;

comparing the first audio note and the second audio note to a plurality of sheet music notes included in the sheet music data;

determining a first sheet music note from the plurality of sheet music notes, the first sheet music note corresponding to the first audio note;

determining a second sheet music note from the plurality of sheet music notes, the second sheet music note following the first sheet music note and corresponding to the second audio note;

displaying a visual representation of the sheet music data including a visual representation of the first sheet music note and a visual representation of the second sheet music note;

determining a first timestamp associated with the first audio note in the first audio data;

determining a period of time from the first timestamp to a current time;

determining a second timestamp in audio accompaniment data corresponding to the first sheet music note in the sheet music data, the audio accompaniment data associated with the sheet music data;

determining a third timestamp by summing the second timestamp and the period of time; and playing the audio accompaniment data at the third timestamp.

13. The system of claim 12, wherein the instructions further configure the system for:

determining a first layout of the sheet music data for the device using a resolution of a display of the device and an orientation of the device; and displaying the visual representation of the sheet music data including the visual representation of the first sheet music note and the visual representation of the second sheet music note using the first layout.

14. The system of claim 13, wherein the instructions further configure the system for, by a second device:

receiving a first location associated with the first sheet music note;

determining a third sheet music note in a second portion of the sheet music data corresponding to the first location;

determining a second layout of the sheet music data for a second display of the second device using a resolution of the second display and an orientation of the second device, the second layout including the third sheet music note; and displaying the visual representation of the sheet music data including the visual representation of the first sheet music note and the visual representation of the second sheet music note using the second layout on the second display.

15. The system of claim 13, wherein the instructions further configure the system for:

determining a first magnification associated with user preferences;

determining a first number of measures per staff based on the resolution, the orientation and the first magnification; and determining a second number of staffs to display based on the resolution, the orientation and the first magnification, wherein the first layout includes the first number of measures per staff in a horizontal direction and the second number of staffs in a vertical direction.

16. The system of claim 12, wherein the instructions further configure the system for:

displaying, at a first time, a first plurality of staffs ending with a final staff; and displaying, at a second time, a second plurality of staffs beginning with the final staff.

17. The system of claim 12, wherein the instructions further configure the system for:

displaying, at a first time, a visual representation of the first musical note at a first position on a staff; and displaying, at a second time after the first time, the visual representation of the first musical note at a second position on the staff to the left of the first position.

18. The system of claim 12, wherein the instructions further configure the system for:

displaying a first visual representation of the first sheet music note using a first magnification at a first position on the display; and displaying a second visual representation of the first music note using a second magnification at a second position on the display, the second magnification different than the first magnification.

* * * * *